United States Patent
Clark

(10) Patent No.: US 8,526,808 B2
(45) Date of Patent: Sep. 3, 2013

(54) TTL PHOTOGRAPHIC WIRELESS COMMUNICATION SYSTEM AND METHOD

(71) Applicant: Lab Partners Associates, Inc., South Burlington, VT (US)

(72) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 0 days.

(21) Appl. No.: 13/708,326

(22) Filed: Dec. 7, 2012

(65) Prior Publication Data

US 2013/0100340 A1 Apr. 25, 2013

Related U.S. Application Data

(63) Continuation of application No. 13/021,951, filed on Feb. 7, 2011, which is a continuation of application No. 12/861,445, filed on Aug. 23, 2010, now Pat. No. 7,885,533, which is a continuation of application No. 12/129,402, filed on May 29, 2008, now Pat. No. 7,783,188.

(60) Provisional application No. 61/030,558, filed on Feb. 21, 2008, provisional application No. 60/940,693, filed on May 29, 2007.

(51) Int. Cl.
*G03B 15/03* (2006.01)

(52) U.S. Cl.
USPC .............................. 396/157; 396/56; 396/189

(58) Field of Classification Search
USPC ........................................... 396/56, 157, 189
See application file for complete search history.

(56) References Cited

U.S. PATENT DOCUMENTS

| | | | |
|---|---|---|---|
| 3,039,375 | A | 6/1962 | Umbach |
| 3,185,056 | A | 5/1965 | Gold et al. |
| 3,205,803 | A | 9/1965 | Burgarella et al. |
| 3,259,042 | A | 7/1966 | Kagan |
| RE26,627 | E | 7/1969 | Burgarella et al. |

(Continued)

FOREIGN PATENT DOCUMENTS

| | | |
|---|---|---|
| CA | 2616030 | 1/2013 |
| CN | 2007-80020420.4 | 6/2010 |

(Continued)

OTHER PUBLICATIONS

Ken Rockwell; How to Use Nikon Strobes Wirelessly, for Free!; Dec. 17, 2005; http://web.archive.org/web/20051217091704/http://www.kenrockwell.com/nikon/ittIslave.htm; last viewed at Internet archive on Apr. 1, 2010.

(Continued)

*Primary Examiner* — Clayton E Laballe
*Assistant Examiner* — Leon W Rhodes, Jr.
(74) *Attorney, Agent, or Firm* — Downs Rachlin Martin PLLC

(57) ABSTRACT

A system and method for synchronizing a remote lighting device to a camera using a hot shoe connection and a wireless communication device connected via the hot shoe connector. The wireless communication device receives a request for flash data from the camera via the hot shoe connector. The wireless communication device responds to the request with response data that mocks information that a photographic lighting device would provide if the photographic lighting device were connected to the hot shoe connector, such that the camera continues to provide TTL data via the hot shoe connector to the wireless communication device.

26 Claims, 9 Drawing Sheets

(56) References Cited

U.S. PATENT DOCUMENTS

| | | |
|---|---|---|
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,684,692 B2 | 3/2010 | Kashiyama |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,834,894 B2 | 11/2010 | Swanson et al. |
| 7,880,761 B2 | 2/2011 | Clark |
| 7,885,533 B2 | 2/2011 | Clark |
| 7,969,504 B2 | 6/2011 | Matsuda et al. |
| 7,970,267 B1 | 6/2011 | Clark |
| 8,121,468 B2 | 2/2012 | Clark |
| 8,130,276 B2 | 3/2012 | Holmes |
| 8,134,576 B2 | 3/2012 | Swanson et al. |
| 8,180,210 B2 | 5/2012 | Clark |
| 8,326,140 B2 | 12/2012 | Clark |
| 8,331,776 B2 | 12/2012 | Clark |
| 8,351,774 B2 | 1/2013 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0067425 A1 | 6/2002 | Iverson |
| 2002/0067923 A1 | 6/2002 | Fujimura |
| 2003/0128272 A1 | 7/2003 | Clough et al. |
| 2003/0133018 A1 | 7/2003 | Ziemkowski |
| 2003/0193588 A1 | 10/2003 | Yuen et al. |
| 2004/0036774 A1 | 2/2004 | Nichols et al. |
| 2005/0006484 A1 | 1/2005 | Ito |
| 2005/0174434 A1 | 8/2005 | Chang et al. |
| 2006/0014563 A1 | 1/2006 | Cheng |
| 2006/0216009 A1 | 9/2006 | Kawamura |
| 2006/0275024 A1 | 12/2006 | McNary |
| 2006/0291016 A1 | 12/2006 | Ishigami et al. |
| 2008/0180531 A1 | 7/2008 | Sekiguchi |
| 2009/0129765 A1 | 5/2009 | King |
| 2009/0135262 A1 | 5/2009 | Ogasawara |
| 2009/0278479 A1 | 11/2009 | Platner et al. |
| 2009/0310012 A1 | 12/2009 | Ueda et al. |
| 2010/0177212 A1 | 7/2010 | Holmes |
| 2010/0209089 A1 | 8/2010 | King |
| 2011/0128390 A1 | 6/2011 | Clark |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0181948 A1 | 7/2012 | Clark |
| 2012/0194699 A1 | 8/2012 | Kouno |
| 2012/0207459 A1 | 8/2012 | Clark |
| 2012/0207460 A1 | 8/2012 | Clark |
| 2012/0243859 A1 | 9/2012 | Clark |
| 2013/0089313 A1 | 4/2013 | Clark |
| 2013/0094845 A1 | 4/2013 | Clark |

FOREIGN PATENT DOCUMENTS

| | | |
|---|---|---|
| CN | 2010-10600736.4 | 2/2012 |
| CN | 2010-10600736.4 | 12/2012 |
| EP | 0984320 A1 | 3/2000 |
| EP | 2162792 A4 | 3/2010 |
| EP | 07760263.9 | 1/2011 |
| EP | 07760263.9 | 7/2011 |
| EP | 8756458.9 | 7/2011 |
| EP | 11177995.5 | 12/2011 |
| EP | 11177995.5 | 7/2012 |
| EP | 10741797 | 8/2012 |
| EP | 11177995.5 | 8/2012 |
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |
| JP | 05-093948 | 4/1993 |
| JP | 07-159866 | 6/1995 |
| JP | 2002-244193 A | 8/2002 |
| JP | 2002-318413 | 10/2002 |
| JP | 2003-172970 A | 6/2003 |
| JP | 2003-215672 A | 7/2003 |
| JP | 2003-325451 | 11/2003 |
| JP | 2004-072230 | 3/2004 |
| JP | 2006-149935 | 6/2006 |
| JP | 2007-067870 A | 3/2007 |

| | | |
|---|---|---|
| JP | 2010-510491 | 8/2012 |
| KR | 10-0728117 | 6/2007 |
| WO | 9638925 A1 | 12/1996 |
| WO | PCT/US2003/037271 | 5/2004 |
| WO | 2004049057 A1 | 6/2004 |
| WO | 2007012041 A2 | 1/2007 |
| WO | 2007118201 A2 | 10/2007 |
| WO | PCT/US2007/066162 | 11/2007 |
| WO | PCT/US2006/028229 | 2/2008 |
| WO | PCT/US2008/065137 | 9/2008 |
| WO | PCT/US2008/065139 | 9/2008 |
| WO | 2008150902 A1 | 12/2008 |
| WO | 2008150904 A1 | 12/2008 |
| WO | PCT/US2010/024088 | 7/2010 |
| WO | 2010093914 A1 | 8/2010 |
| WO | 2010093927 A1 | 8/2010 |
| WO | 2010093994 A1 | 8/2010 |
| WO | PCT/US2010/024108 | 9/2010 |
| WO | PCT/US2010/024195 | 9/2010 |
| WO | PCT/US2011/044008 | 11/2011 |
| WO | 2012009537 A1 | 1/2012 |
| WO | PCT/US2012/025915 | 6/2012 |
| WO | 2012161772 A1 | 11/2012 |

OTHER PUBLICATIONS

U.S. Appl. No. 12/861,445, filed Sep. 30, 2010, Notice of Allowance, 7,885,533.
U.S. Appl. No. 13/021,951, filed Nov. 25, 2011, Notice of Allowance, 8,331,776.
U.S. Appl. No. 13/021,951, filed Feb. 13, 2012, Withdrawal of Notice of Allowance, 8,331,776.
U.S. Appl. No. 13/021,951, filed Feb. 22, 2012, Office Action, 8,331,776.
U.S. Appl. No. 13/253,596, filed Nov. 30, 2011, Office Action, 8,326,140.
U.S. Appl. No. 13/253,596, filed Feb. 29, 2012, Response to Office Action, 8,326,140.
U.S. Appl. No. 13/253,596, filed May 9, 2012, Final Office Action, 8,326,140.
U.S. Appl. No. 12/129,402, filed Apr. 19, 2010, Notice of Allowance, 7,783,188.
Affadavit of James E. Clark: FlashWizard II Synchronizer, signed Mar. 20, 2008; previously submitted in U.S. Appl. No. 11/697,241.
Analog Devices Technical Data Sheet for ADF7020-1 Transceiver IC, Analog Devices, Inc., 2005, pp. 1-44.
ASH Transceiver Impedance Matching; Document Created on Dec. 10, 2001; pp. 1 to 10; http://www.rfm.com/products/apnotes/antennamatch.pdf; last viewed on Dec. 15, 2005.
Canon EOS 40D Usuer's Manual; about Sep. 2007 Canon Corporation.
Declaration of James E. Clark filed Feb. 18, 2005 in U.S. Appl. No. 10/306,759.
Ken Rockwell: Nikon SU-800 Remote Commander; Nov. 1, 2005, http://www.kenrockwell.com/nikon/su800.htm; last viewed on Jul. 18, 2012.
Nikon D2x; Sep. 2004; pp. 1 to 12; Nikon Corporation.
Nikon WT-1 Transmitter User's Manual; around Dec. 2003, Nikon Corporation.
Nikon WT-2 Article, Part 1; Nikon Corporation; http://nikonimaging.com/global/technology/scene/11/index.htm; last viewed on Mar. 14, 2008.
Nikon WT-2 Article, Part 2: Nikon Corporation; http://nikonimaging.com/global/technology/scene/11/index_02.htm; last viewed on Mar. 14, 2008.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001 pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Jul. 17, 2005; pp. 1 to 7; http://web.archive.org/web/20050717015832/http://www.qtm.com/wireless/freewire.html last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Robert Hanashiro; Equipment Corner—News & Notes for all Those Gear-Heads; Nov. 26, 2001; pp. 1 to 3; http://www.sportsshooter.com/news_story.html?id=594; last viewed on Septemer, 17, 2002.
XE-200 RF Shutter Release for Rebel 2000; http://zenopuseelectronix.com/XE-200.html; last viewed on Sep. 9, 2002.
U.S. Appl. No. 11/305,668, filed Mar. 8, 2006, Office Action, 7,133,607.
U.S. Appl. No. 11/305,668, filed Jun. 8, 2006, Response to Office Action, 7,133,607.
U.S. Appl. No. 11/305,668, filed Jun. 13, 2006, Supplemental Response to Request for Clarification by the Examiner, 7,133,607.
U.S. Appl. No. 11/305,668, filed Jun. 30, 2006, Notice of Allowance, 7,133,607.
U.S. Appl. No. 11/305,668, filed Mar. 29, 2007, Request for Correction of Letters, 7,133,607.
U.S. Appl. No. 11/529,203, filed Aug. 14, 2007, Office Action, 7,362,965.
U.S. Appl. No. 11/529,203, filed Oct. 16, 2007, Terminal Disclaimer, 7,362,965.
U.S. Appl. No. 11/529,203, filed Oct. 16, 2007, Response to Office Action, 7,362,965.
U.S. Appl. No. 11/529,203, filed Oct. 25, 2007, Terminal Disclaimer, 7,362,965.
U.S. Appl. No. 11/529,203, filed Dec. 14, 2007, Notice of Allowance, 7,362,965.
U.S. Appl. No. 12/104,950, filed Dec. 31, 2009, Office Action, 7,764,875.
U.S. Appl. No. 12/104,950, filed Feb. 1, 2010, Response to Office Action, 7,764,875.
U.S. Appl. No. 12/104,950, filed Mar. 23, 2010, Notice of Allowance, 7,764,875.
U.S. Appl. No. 12/843,254, filed Jul. 27, 2010, Preliminary Remarks, 8,121,468.
U.S. Appl. No. 12/843,254, filed Aug. 25, 2011, Office Action, 8,121,468.
U.S. Appl. No. 12/843,254, filed Aug. 25, 2011, Response to Office Action, 8,121,468.
U.S. Appl. No. 12/843,254, filed Aug. 25, 2011, Terminal Disclaimer, 8,121,468.
U.S. Appl. No. 12/843,254, filed Nov. 28, 2011, Notice of Allowance, 8,121,468.
U.S. Appl. No. 13/399,333, filed Jun. 14, 2012, Office Action, 8,351,774.
U.S. Appl. No. 13/399,333, filed Sep. 14, 2012, Response to Office Action, 8,351,774.
U.S. Appl. No. 13/399,333, filed Sep. 14, 2012, Terminal Disclaimers, 8,351,774.
U.S. Appl. No. 13/399,333, filed Sep. 28, 2012, Notice of Allowance, 8,351,774.
U.S. Appl. No. 10/306,759, filed Aug. 29, 2003, Office Action, 7,016,603.
U.S. Appl. No. 10/306,759, filed Dec. 18, 2003, Response to Office Action, 7,016,603.
U.S. Appl. No. 10/306,759, filed Dec. 24, 2003, Examiner Interview Summary, 7,016,603.
U.S. Appl. No. 10/306,759, filed Mar. 27, 2004, Final Office Action, 7,016,603.
U.S. Appl. No. 10/306,759, filed Apr. 15, 2004, Examiner Interview Summary, 7,016,603.

U.S. Appl. No. 10/306,759, filed Apr. 20, 2004, Response to Final Office Action, 7,016,603.
U.S. Appl. No. 10/306,759, filed Aug. 24, 2004, Office Action, 7,016,603.
U.S. Appl. No. 10/306,759, filed Feb. 18, 2005, Request for Continued Examination, 7,016,603.
U.S. Appl. No. 10/306,759, filed Mar. 29, 2005, Office Action, 7,016,603.
U.S. Appl. No. 10/306,759, filed Apr. 14, 2005, Response to Office Action, 7,016,603.
U.S. Appl. No. 10/306,759, filed Jun. 29, 2005, Final Office Action, 7,016,603.
U.S. Appl. No. 10/306,759, filed Aug. 25, 2005, Response to Final Office Action, 7,016,603.
U.S. Appl. No. 10/306,759, filed Sep. 16, 2005, Notice of Allowance, 7,016,603.
U.S. Appl. No. 10/306,759, filed Oct. 18, 2005, 312 Amendment, 7,016,603.
U.S. Appl. No. 10/306,759, filed Dec. 20, 2005, Response to 312 Amendment, 7,016,603.
U.S. Appl. No. 10/306,759, filed Jan. 4, 2006, Response to 312 Amendment, 7,016,603.
U.S. Appl. No. 10/306,759, filed Nov. 18, 2006, Certificate of Correction, 7,016,603.
U.S. Appl. No. 11/488/491, filed Oct. 16, 2007, Office Action.
U.S. Appl. No. 11/490,322, filed Apr. 20, 2010, Office Action, 7,880,761.
U.S. Appl. No. 11/490,322, filed Jul. 12, 2010, Response to Office Action, 7,880,761.
U.S. Appl. No. 11/490,322, filed Sep. 15, 2010, Notice of Allowance, 7,880,761.
U.S. Appl. No. 12/250,914, filed Jun. 12, 2009, Office Action, 7,702,228.
U.S. Appl. No. 12/250,914, filed Jun. 29, 2009, Response to Office Action and Terminal Disclaimer, 7,702,228.
U.S. Appl. No. 12/250,914, filed Oct. 28, 2009, Terminal Disclaimer, 7,702,228.
U.S. Appl. No. 12/250,914, filed Dec. 3, 2009, Notice of Allowance, 7,702,228.
U.S. Appl. No. 12/762,811, filed Dec. 28, 2010, Office Action, 7,970,267.
U.S. Appl. No. 12/762,811, filed Mar. 28, 2011, Response to Office Action, 7,970,267.
U.S. Appl. No. 12/762,811, filed Mar. 28, 2011, Terminal Disclaimer, 7,970,267.
U.S. Appl. No. 12/762,811, filed Apr. 20, 2011, Notice of Allowance, 7,970,267.
U.S. Appl. No. 13/169,413, filed Dec. 20, 2011, Office Action, 8,180,210.
U.S. Appl. No. 13/169,413, filed Jan. 16, 2012, Response to Office Action, 8,180,210.
U.S. Appl. No. 13/169,413, filed Jan. 16, 2012, Terminal Disclaimers, 8,180,210.
U.S. Appl. No. 13/169,413, filed Mar. 22, 2012, Notice of Allowance, 8,180,210.
U.S. Appl. No. 13/438,500, filed Jun. 18, 2012, Office Action.
U.S. Appl. No. 13/438,500, filed Sep. 14, 2012, Response to Office Action.
U.S. Appl. No. 13/438,500, filed Sep. 14, 2012, Terminal Disclaimers.
U.S. Appl. No. 11/697,241, filed Nov. 8, 2007, Office Action, 7,437,063.
U.S. Appl. No. 11/697,241, filed Mar. 10, 2008, Response to Office Action, 7,437,063.
U.S. Appl. No. 11/697,241, filed Mar. 24, 2008, Examiner Interview Summary, 7,437,063.
U.S. Appl. No. 11/697,241, filed Jun. 9, 2008, Notice of Allowance, 7,437,063.
U.S. Appl. No. 12/129,447, filed Apr. 12, 2010, Notice of Allowance, 7,775,575.
U.S. Appl. No. 12/129,447, filed Apr. 12, 2010, Examiner Amendment, 7,775,575.
U.S. Appl. No. 13/208,686, filed Feb. 6, 2013, Office Action.
U.S. Appl. No. 13/208,706, filed Dec. 26, 2012, Office Action.
U.S. Appl. No. 12/705,052, filed Mar. 27, 2012, Office Action, 8,326,141.
U.S. Appl. No. 12/705,052, filed Jun. 27, 2012, Response to Office Action, 8,326,141.
U.S. Appl. No. 12/705,052, filed Sep. 5, 2012, Notice of Allowance, 8,326,141.
U.S. Appl. No. 12/705,096, filed Mar. 12, 2012, Office Action, 8,326,136.
U.S. Appl. No. 12/705,096, filed Jun. 12, 2012, Response to Office Action, 8,326,136.
U.S. Appl. No. 12/705,096, filed Aug. 8, 2012, Notice of Allowance, 8,326,136.
U.S. Appl. No. 12/705,164, filed Mar. 29, 2012, Office Action.
U.S. Appl. No. 12/705,164, filed Jun. 29, 2012, Response to Office Action.
U.S. Appl. No. 12/705,164, filed Sep. 7, 2012, Office Action.
U.S. Appl. No. 12/705,164, filed Nov. 29, 2012, RCE.
U.S. Appl. No. 13/183,046, filed Feb. 13, 2013, Office Action.
U.S. Appl. No. 12/104,950, filed Apr. 17, 2008.
U.S. Appl. No. 12/843,254, filed Jul. 26, 2010.
U.S. Appl. No. 13/399,333, filed Feb. 17, 2012.
U.S. Appl. No. 11/490,322, filed Jul. 20, 2006.
U.S. Appl. No. 13/016,345, filed Jan. 28, 2011.
U.S. Appl. No. 11/697,241, filed Apr. 5, 2007.
U.S. Appl. No. 12/250,914, filed Oct. 14, 2008.
U.S. Appl. No. 12/762,811, filed Apr. 19, 2010.
U.S. Appl. No. 13/169,413, filed Jun. 27, 2011.
U.S. Appl. No. 13/438,500, filed Apr. 3, 2012.
U.S. Appl. No. 12/129,447, filed May 29, 2008.
U.S. Appl. No. 13/201,182, filed Aug. 11, 2011.
U.S. Appl. No. 13/201,185, filed Aug. 11, 2011.
U.S. Appl. No. 13/201,281, filed Aug. 12, 2011.
U.S. Appl. No. 13/208,686, filed Aug. 12, 2011.
U.S. Appl. No. 13/208,706, filed Aug. 12, 2011.
U.S. Appl. No. 13/401,175, filed Feb. 21, 2012.
U.S. Appl. No. 12/705,052, filed Feb. 12, 2010.
U.S. Appl. No. 12/705,096, filed Feb. 12, 2010.
U.S. Appl. No. 12/705,164, filed Feb. 12, 2010.
U.S. Appl. No. 13/183,046, filed Jul. 14, 2011.
U.S. Appl. No. 13/735,325, filed Jan. 7, 2013.
U.S. Appl. No. 13/708,326, filed Dec. 7, 2012.
U.S. Appl. No. 13/692,515, filed Dec. 3, 2012.
U.S. Appl. No. 13/692,550, filed Dec. 3, 2012.
U.S. Appl. No. 13/735,325, date of document Mar. 15, 2013, Office Action.
U.S. Appl. No. 13/735,325, date of document Mar. 21, 2013, Response to Office Action w/ Terminal Disclaimers.
U.S. Appl. No. 13/208,706, date of document Mar. 26, 2013, Response to Office Action.
U.S. Appl. No. 13/016,345, date of document Apr. 26, 2013, Restriction Requirement.
U.S. Appl. No. 13/183,046, date of document Apr. 29, 2013, Response to Office Action.

TTL PHOTOGRAPHIC WIRELESS COMMUNICATION SYSTEM AND METHOD

RELATED APPLICATION DATA

This application is a continuation of U.S. patent application Ser. No. 13/021,951, filed Feb. 7, 2011, entitled "External Photographic Wireless TTL Communication Device and Method," now allowed, which is a continuation of U.S. patent application Ser. No. 12/861,445, filed Aug. 23, 2010, entitled "External Photographic Wireless Communication Device," now U.S. Pat. No. 7,885,533, which application is a continuation of U.S. patent application Ser. No. 12/129,402, filed May 29, 2008, entitled "System and Method for Maintaining Hot Shoe Communications Between a Camera and a Wireless Device," now U.S. Pat. No. 7,783,188, which application claims the benefit of priority of U.S. Provisional Patent Application Ser. No. 61/030,558, filed Feb. 21, 2008, and titled "Photographic Wireless Communication For Lighting Device Control," and U.S. Provisional Patent Application Ser. No. 60/940,693, filed May 29, 2007, and titled "Camera Hot Shoe Wireless Communication Module and Method." Each of these applications is incorporated by reference herein in its entirety.

This application is related to U.S. patent application Ser. No. 13/253,596, filed on Oct. 5, 2011, entitled "External Photographic Wireless Communication Device and Method," now U.S. Pat. No. 8,326,140.

FIELD OF THE INVENTION

The present invention generally relates to the field of photographic wireless communication. In particular, the present invention is directed to a system and method for maintaining hot shoe communications between a camera and a wireless device.

BACKGROUND

Various camera bodies are equipped with a hot shoe accessory connector. A flash lighting device may be connected, directly or through an extension cord, to the hot shoe connector. The emission of flash light from the lighting device can be synchronized to an image acquisition by the camera by a synchronization signal received by the lighting device via the connection to the hot shoe connector.

A remote flash lighting device can be triggered by wireless synchronization, which has been achieved using optical and radio frequency communications to the remote flash device. Radio frequency synchronization typically involves connecting a radio transmitter to the camera body and a radio receiver to the remote flash device. The radio transmitter sends a signal to the radio receiver to trigger the remote flash device in synchronization with image acquisition by the camera. Some prior radio frequency systems include a transmitter at the remote flash device for sending a confirmation signal back to the camera side radio that indicates the flash-side radio successfully triggered of the flash device. However, a system where a remote flash device wirelessly transmits information about the flash device itself to the camera body is not known to the inventor.

Through-the-lens (TTL) flash photographic control typically involves the camera body measuring an amount of light provided by a flash lighting device during a test firing of the flash device. The measurement is performed through the lens of the camera. The camera then provides an indication to the flash device connected to the hot shoe connector of the amount of light for a main flash to be used for image acquisition. The indication of the amount of light can be made by providing start and stop signals to the flash device via the hot shoe connector. In another example, the indication of the amount of light can be made by providing a serial data via the hot shoe connector to the flash device connected thereto that includes an adjustment to the amount of light that was provided in the test flash. The flash device in the hot shoe can trigger a remote flash light by utilizing optical flash pulses (e.g., visible light or infrared light). The optical pulses can also be used to send TTL power adjustments to the remote flash device. However, the remote lighting devices do not send information about the remote lighting device to the light device in the hot shoe connector of the camera body. Additionally, this system requires that a light emitting device be connected to the hot shoe connector.

SUMMARY OF THE DISCLOSURE

In one embodiment, a method of synchronizing a remote lighting device to image acquisition of a camera, the camera having a hot shoe connector with a wireless communication device connected thereto, wherein the wireless communication device is not a photographic lighting device and a photographic lighting device is not directly connected to the hot shoe connector of the camera, is provided. The method includes receiving a first request for flash data from the camera at the wireless communication device via the hot shoe connector of the camera; responding to the first request for flash data with response data that mocks information that a photographic lighting device would provide if the photographic lighting device were connected to the hot shoe connector, such that the camera continues to provide TTL data via the hot shoe connector to the wireless communication device; receiving a synchronization signal at the wireless communication device via the hot shoe connector of the camera; wirelessly communicating TTL information from the wireless communication device to a remote photographic lighting device, the remote photographic lighting device including an internal wireless communication functionality, the TTL information being based on the TTL data from the camera body; wirelessly communicating a remote synchronization signal from the wireless communication device to the remote photographic lighting device; and synchronizing the remote photographic lighting device to an image acquisition by the camera using the remote synchronization signal and the TTL information.

In another embodiment, a method of synchronizing a remote lighting device to image acquisition of a camera, the camera having a hot shoe connector with a wireless communication device connected thereto, wherein the wireless communication device is not a photographic lighting device and a photographic lighting device is not directly connected to the hot shoe connector of the camera, is provided. The method includes receiving a wireless communication of data from a remote photographic lighting device at the wireless communication device; receiving a first request for flash data from the camera at the wireless communication device via the hot shoe connector of the camera; responding to the first request for flash data with response data that mocks information that a photographic lighting device would provide if the photographic lighting device were connected to the hot shoe connector, such that the camera continues to provide TTL data via the hot shoe connector to the wireless communication device; receiving a synchronization signal at the wireless communication device via the hot shoe connector of the camera; wirelessly communicating TTL information from the wireless communication device to the remote photographic lighting device, the remote photographic lighting device including an internal wireless communication functionality, the TTL information being based on the TTL data from the camera body; wirelessly communicating a remote synchronization signal from the wireless communication device to the remote photographic lighting device; and synchronizing the remote photographic lighting device to an image acquisition by the camera using the remote synchronization signal and the TTL information.

In yet another embodiment, a system for synchronizing a remote lighting device to image acquisition of a camera, is provided. The system includes a camera having a first hot shoe connector; a remote lighting device including a first wireless communication functionality internal to said remote lighting device; and a photographic wireless communication device including: a second hot shoe connector configured to connect to the first hot shoe connector; a second wireless communication functionality; and a processing element, said processing element and photographic wireless communication device configured to receive one or more data requests from said camera via the second hot shoe connector when the second hot shoe connector is connected to the first hot shoe connector, and to respond to the one or more data requests with response information that mocks information that a flash device would provide if the flash device were connected to the first hot shoe connector instead of said photographic wireless communication device, such that in response to the response information said camera continues to provide TTL data via the first hot shoe to said photographic wireless communication device.

Example TTL information in certain implementations may include, but are not limited to, a shutter speed, an ISO, an aperture, a zoom distance, a focus distance, an exposure value, a TTL mode, an indication of flash model, TTL pre-flash information, an information related to an amount of light to be emitted by a remote photographic lighting device for a TTL main flash exposure, and any combinations thereof.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

A system and method is disclosed for serial communication between a camera body and a wireless communication device connected to a hot shoe connector of the camera body. In one exemplary implementation, flash device data from a remote lighting device may be wirelessly communicated to the wireless communication device, which communicates the flash device data to the camera body via the hot shoe connector.

It has been determined that certain camera systems will not communicate serial data via the hot shoe connector of a camera body unless a serial communication compatible flash device is connected thereto. In one embodiment, a wireless communication device connected to the hot shoe connector of a camera body communicates serial data to the camera body that provides an indication to the camera body that mimics a flash device being connected to the hot shoe connector. One exemplary benefit of this "mock" indication is that serial communication between a non-flash wireless communication device and a camera body via a hot shoe connector may be maintained even where a flash device is not connected to the hot shoe connector. In one exemplary implementation the wireless communication device communicates actual information about one or more remote lighting devices (e.g., acquired by the wireless communication device using radio frequency wireless communication) to the camera body via the hot shoe connector.

Figure 1:
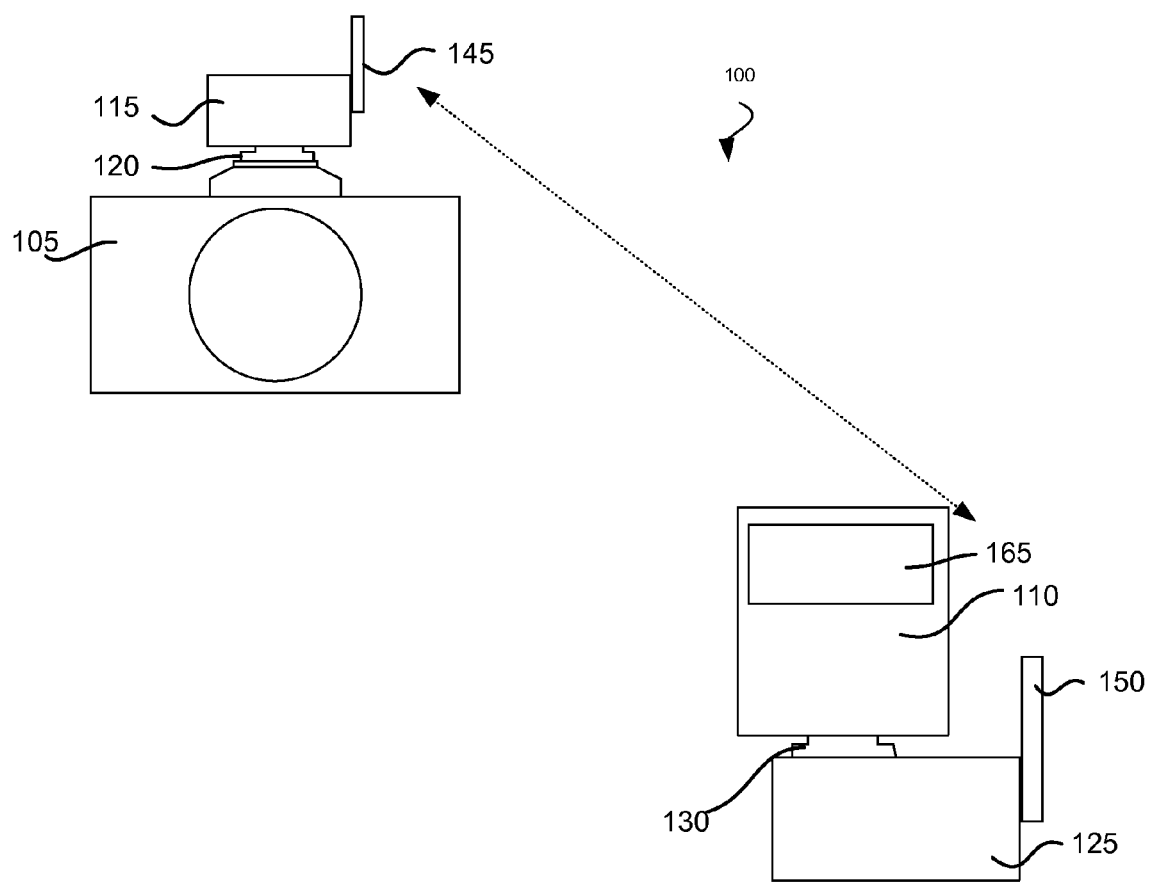
FIG. 1 illustrates one exemplary implementation of a wireless communication system for wireless communication between a camera body and a remote lighting device.

FIG. 1 illustrates one exemplary implementation of a wireless communication system 100 for wireless communication between a camera body 105 and a remote lighting device 110. A wireless communication device 115 is connected to camera body 105 via a hot shoe connector 120. Wireless communication device 115 is shown as directly connected to hot shoe connector 120. In another example, wireless communication device 115 may be connected to hot shoe connector 120 via an extension cable or other extension device.

Remote lighting device 110 is connected to a wireless communication device 125. The connection between remote lighting device 110 and wireless communication device 125 is shown as a connection via a hot shoe connector 130 of remote lighting device 110. Wireless communication device 125 may be connected to remote lighting device 110 in a variety of ways. Example connections for wireless communication device 125 to a remote lighting device include, but are not limited to, a hot shoe connector, an internal wiring connection (e.g., were remote lighting device 110 has an internal wireless communication functionality), and any combinations thereof. In one example, wireless communication device 125 is connected in a manner and configured to receive flash data from remote lighting device 110 for wireless communication to wireless communication device 115. In one such example, a wireless communication device associated with a remote flash device may include one or more of the features and aspects discussed herein with respect to a wireless communication device connected to a hot shoe connector of a camera body.

Wireless communication device 115 includes an antenna 145 and associated wireless communication circuitry for wirelessly transmitting and receiving information to and/or from remote lighting device 110. Wireless communication device 125 includes an antenna 150 and associated wireless communication circuitry for wirelessly transmitting and receiving information to and/or from camera body 105. Example wireless communication circuitry includes, but is not limited to, a receiver, a transmitter, a transceiver, and any combinations thereof. Antennas 145 and 150 are illustrated as external antennas. In another example, an antenna may be partially or completely contained in a housing of a wireless communication device.

In one exemplary implementation of the operation of system 100, camera body 105 may communicate synchronization information and/or other camera data to wireless communication device 115 via hot shoe connector 120. Part or all of the information may then be transmitted wirelessly via radio frequency utilizing transmission circuitry and antenna 145. Antenna 150 detects the radio frequency signal. Circuitry of wireless communication device 125 communicates the information to lighting device 110 via hot shoe connection 130. Circuitry of lighting device 110 utilizes the information for proper synchronization and/or other control of lighting device (e.g., light emission from a lighting element 165 of lighting device 110).

In another exemplary implementation of the operation of system 100, flash data from lighting device 110 (e.g., flash readiness, flash mode, flash capability, make/model) may be communicated to camera body 105. Lighting device 110 communicates the information to wireless communication device 125 via hot shoe connection 130. Wireless communication device 125 processes the information for wireless communication using radio frequency via transmission circuitry and antenna 150. Antenna 145 and receiver circuitry of wireless communication device 115 receive the radio frequency transmission. Wireless communication device 115 communicates the information to camera body 105 via hot shoe connector 120.

In yet another exemplary implementation of the operation of system 100, wireless communication device 115 utilizes flash data received from remote flash device 110 to maintain serial communication with camera body 105 via hot shoe connector 120.

A hot shoe connector (e.g., hot shoe connectors 120, 130) is a connector in the photographic field typically utilized for attaching a flash device to a camera body. In one example, a hot shoe connector may be a female connector. In another example, a hot shoe connector may be a male connector. Hot shoe connectors may have varying physical dimensions and communication contact configurations depending on a number of factors (e.g., manufacturer and model of the camera body). In one example, a hot shoe connector is a standardized hot shoe connector having dimensions based on a standard definition set by the International Organization for Standardization (e.g., ISO standard 518:2006). Certain camera bodies produced by Nikon and Canon utilize a standard dimensioned hot shoe connector. Certain camera bodies produced by Minolta utilize a hot shoe connector having dimensions that are not standardized (e.g., proprietary to Minolta). Different camera manufacturers do utilize different hot shoe connection configurations. A hot shoe connector typically includes a flash synchronization contact (e.g., positioned in the center of the hot shoe connector). This flash synchronization contact may be standardized across manufacturers. A flash synchronization contact of a hot shoe connector typically provides a voltage low signal to indicate a synchronization signal. A hot shoe connector may also include one or more additional contacts utilized for communicating other data (e.g., information about the camera, information about a flash device). For example, certain Nikon camera bodies include three additional data contacts (e.g., one contact for data in/out of the camera, one contact for ready status, and one contact for clock signal). In another example, certain Canon camera bodies include four additional data contacts (e.g., one contact for data into the camera body, one contact for data out from the camera body, one contact for clock signal, one contact for wakeup/autofocus assist information). An example of a hot shoe connector configuration and contact layout is discussed below with respect to FIGS. 2A and 2B.

One or more of the data contacts (e.g., the additional contacts that are not the center synchronization contact) of a hot shoe connector may utilize a serial protocol of communication. In one example, one or more of the data contacts of a hot shoe connector may make up a serial peripheral interface ("SPI"). Camera and flash data communicated over the one or more data contacts of a hot shoe connector may be referred to herein as SPI data. It is contemplated that where the term SPI data is utilized herein that other protocols of hot shoe connector data communication may be applied in addition to (or in place of) an SPI protocol. It is also contemplated that asynchronous data communication (e.g., without clock) may be used. Additionally, it is noted that differing camera manufacturers may utilize different command and/or data structures within an SPI data construct. Discussion herein of camera data, flash data, and SPI data contemplates that appropriate adjustments may be taken in programming and configuration to accommodate variances based on protocol and manufacturer specific command and/or data structures.

Figure 2A:
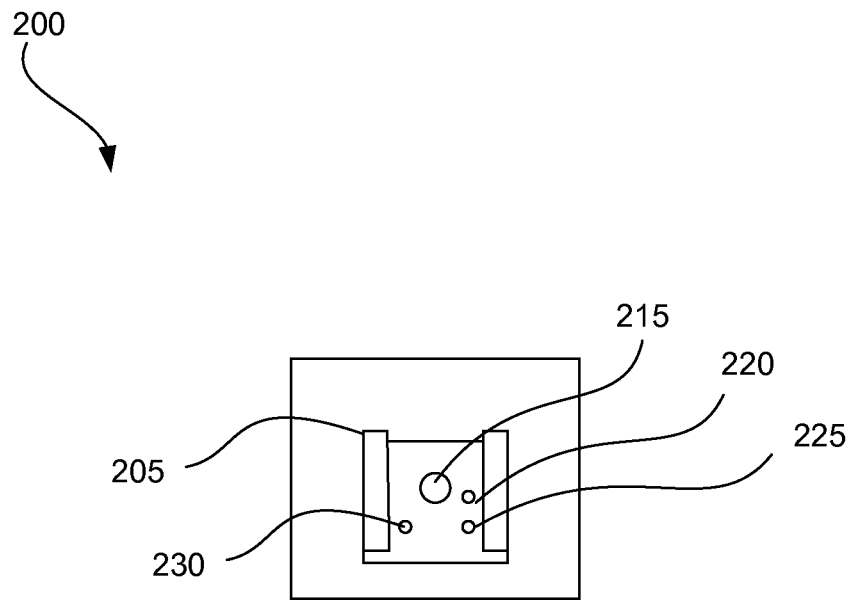
FIG. 2A illustrates one example of a hot shoe connector.
Figure 2B:
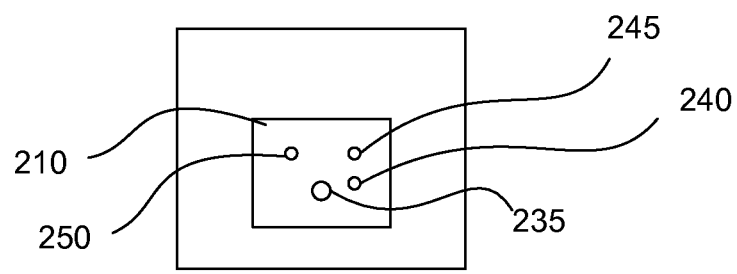
FIG. 2B illustrates another example of a hot shoe connector.

FIGS. 2A and 2B illustrate one example configuration of a hot shoe connector 205 and a hot shoe connector 210. FIG. 2A illustrates hot shoe connector 205 having a female configuration. In one example, a camera body may include a hot shoe connector (e.g., hot shoe connector 120 of FIG. 1) having a female configuration. Hot shoe connector 205 includes a center synch contact 215 and three additional connectors 220, 225, and 230. FIG. 2B illustrates hot shoe connector 210 having a male configuration. In one example, a wireless communication device (e.g., device 115 of FIG. 1) may include a hot shoe connector having a male configuration. In another example, a lighting device (e.g., lighting device 110) may include a hot shoe connector having a male configuration. In yet another example, a wireless communication device (e.g., device 125 of FIG. 1) may include a hot shoe connector having a female configuration. Hot shoe connector 210 includes a center synch contact 235 and three additional connectors 240, 245, and 250. A female hot shoe connector, such as connector 205, and a male hot shoe connector, such as connector 210, may be configured to mate with each other such that their synchronization contacts and data contacts provide electrical communication therebetween for a synchronization signal and/or photographic data (e.g., serial camera data and/or flash data).

Figure 3:
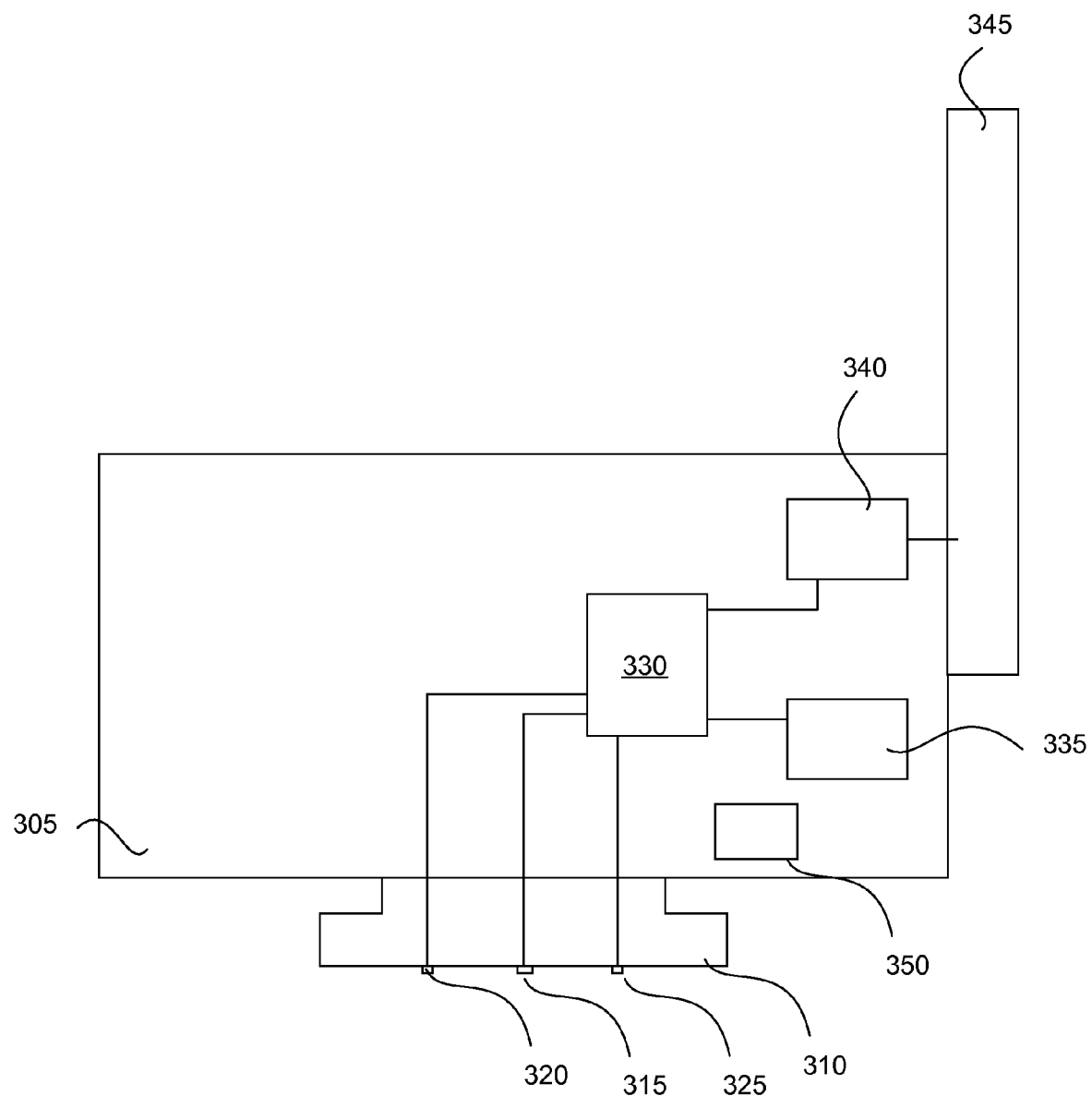
FIG. 3 illustrates one exemplary implementation of a wireless communication device having a hot shoe connector.

FIG. 3 illustrates an exemplary implementation of a wireless communication device 305 having a hot shoe connector 310 with a synchronization contact 315 and data contacts 320, 325. Hot shoe connector 310 is shown with two data contacts 320, 325 for convenience of view. It is contemplated that a hot shoe connector, such as connector 310 may have any number of data contacts. Wireless communication device 305 includes a control circuitry 330 for controlling the operation of the wireless communication device. Control circuitry 330 may include a processor. Example processors include, but are not limited to, Atmel ATmega168, AT90USB1287, Texas Instruments CC1110, and any combinations thereof. Wireless communication device 305 also includes a memory 335. Memory 335 is electrically connected with control circuitry 330. Memory 335 may include machine executable instructions that may be executed by control circuitry 330 consistent with one or more aspects and/or embodiments of the disclosure herein. Memory 335 may also include stored data related to one or more remote lighting devices and/or other elements of communication via hot shoe connector 310 with a camera body to which wireless communication device 305 is connected.

Wireless communication device 305 includes a wireless communication circuitry 340 and an antenna 345. Wireless communication circuitry 340 is connected with control circuitry for providing wireless communication to and/or from wireless communication device 305. Examples of wireless communication circuitry include, but are not limited to, a receiver, a transmitter, a transceiver, and any combinations thereof. Wireless communication circuitry 340 is shown as separate from control circuitry 330 and memory 335. It is contemplated that any two or more of wireless communication circuitry 340, control circuitry 330, and memory 335 may be combined in an integrated circuitry. In another example, wireless communication circuitry 340 may include a processing capability and/or a memory in addition to control circuitry 340 and memory 335. An example of a transceiver circuitry may include a ChipCon CC1110 (by TI) CPU and transceiver all in one chip. Antenna 345 is shown as an external antenna. In another example, antenna 345 may be configured completely or partially within the body of device 305. In yet another example, antenna 345 may be removable from device 305. In still another example, antenna 345 may be adjustable with respect to its position relative to the body of device 305. Wireless communication device 305 also includes a power source 350 for powering the operation of device 305 and its components.

Hot shoe connector 310 of wireless communication device 305 may be connected to a hot shoe connector of a camera body. Wireless communication device 305 may be utilized to provide wireless communication and control between the camera body and one or more remote devices (e.g., one or more remote lighting devices). In one example, camera data and flash data may be communicated between wireless communication device 305 and the camera body via data contacts 320, 325 (e.g., to facilitate wireless communication between the camera body and a remote device). In another example, hot shoe connector 310 may be connected (e.g., directly, via cord, via a male/female hot shoe connector adapter) to a remote flash device. In one such example, wireless communication device 305 may be configured to receive (e.g., with control circuitry 330, memory 335, machine executable instruction, and/or other circuitry) flash data from the remote lighting device. Reception of flash data from a remote lighting device may occur in a variety of ways. In one example, a wireless communication functionality connected to a remote lighting device mimics the serial data (e.g., camera data) that a lighting device would expect in order to communicate flash data (e.g., via a hot shoe connector or other connector).

Examples of camera data that may be communicated via one or more data contacts of a hot shoe connector include, but are not limited to, a camera/film ISO (gain), a shutter speed, an aperture, an exposure compensation value (e.g., a flash exposure compensation value, a camera exposure compensation value), zoom distance, focus distance, exposure value, mode of operation, model compatibility, protocol revision data, auto-flash mode indication, a distance from the camera to a subject, a zoom factor, an indication that pre-flash is not used during auto-mode, and any combinations thereof. The use of the term "ISO" data and/or value in reference to camera and/or flash data herein is meant to represent a standard way of measuring the sensitivity of film (in film photography) and the sensitivity of a sensor (in digital photography). Such a sensitivity may also be referred to as a gain. In one example, ISO/gain sensitivity data represents a sensitivity value based on ISO standard 5800:1987. In another example, ISO/gain sensitivity data represents a sensitivity value based on ISO standard 12232:2006.

Examples of flash data that may be communicated via a one or more data contacts of a hot shoe connector (e.g., from a remote flash device to a wireless communication device, from a wireless communication device to a camera body) include, but are not limited to, a flash readiness data, a flash tilt indicator (e.g., flash head tilted, flash head not tilted), remote flash zone setting value, model compatibility, remote/local mode (s), a flash zoom value (e.g., flash zoom quantitative value, flash zoom movement complete/not complete value), a protocol revision data, a TTL mode, an indication of flash model, a flash battery power status, and any combinations thereof. In one example, flash data is communicated via a hot shoe connector from a flash device to a wireless communication device connected thereto (e.g., directly, with an extension cord). In another example, flash data is communicated via a connector other than a hot shoe connector from a flash device to a wireless communication device (e.g., wireless communication device 125). In yet another example, flash data is communicated via a hot shoe connector from a wireless communication device to a camera body.

As discussed above, a synchronization signal from a camera body can be utilized to synchronize the operation of a remote device (e.g., the firing of a remote flash device, triggering a remote camera) and/or triggering a flash device connected to the hot shoe connector (e.g., via a wire, directly inserted in the hot shoe connector, inserted in a hot shoe connector of a pass-through wireless communication device connected to the hot shoe connector of the camera body). Camera data communicated via one or more of the additional contacts (e.g., not the center synchronization contact) of a hot shoe connector may be utilized in a variety of ways. In one example, camera and flash data may be exchanged via the hot shoe connector in a TTL (through the lens) lighting mode. Various versions of TTL lighting control may be utilized. Example TTL lighting control protocols include, but are not limited to, A-TTL (advanced TTL), E-TTL (evaluative TTL), E-TTL II, i-TTL (a Nikon variant), D-TTL (another Nikon variant), and any combinations thereof (verify combinations).

Data to be communicated from a wireless communication device to a camera body may represent a status (e.g., light ready, flash zoom value, etc) of one or more lighting devices to be controlled by a wireless communication device. In another example, data for communication from a wireless communication device to a camera body may represent identification information (e.g., lighting device model data, maximum light power data) about one or more lighting devices to be controlled by a wireless communication device. In yet another example, data for communication from a wireless communication device to a camera body may represent zone settings for one or more lighting devices to be controlled by a wireless communication device.

In one exemplary implementation, one or more data elements to be provided to a camera body from a wireless communication device via one or more data contacts of a hot shoe is actual data from a remote lighting device not connected to the hot shoe connector of the camera body. In one such example, the wireless communication device utilizes wireless communication to retrieve the one or more actual data elements from the one or more remote lighting devices. For example, referring again to FIG. 1, camera body 105 makes a request for information related to a lighting device to be controlled using information provided via a hot shoe communication. Wireless communication device 115 wirelessly communicates to one or more of wireless communication devices (e.g., wireless communication device 125) requesting the information. The corresponding wireless communication device communicates with the corresponding remote lighting device 110 to obtain the information. The one or more of the wireless communication devices communicate the information wirelessly to wireless communication device 115. Wireless communication device 115 communicates the flash data to camera body 105 via hot shoe connector 120.

The timing of retrieval of actual data values from one or more remote lighting devices may occur at one or more of a variety of times with respect to a communication from a camera body. Examples of such timing include, but are not limited to, wireless retrieval of the information from a remote lighting device at a time other than when the camera body requests the information, retrieval at substantially the same time as the request (e.g., in real time), retrieval at a time prior to the request, retrieval at a time after an initial request and prior to a subsequent request, retrieval during a power-on/wake status cycle prior to the request, retrieval between a wake up status indicator and an initial burst of communication from a camera body, retrieval during the time between bursts of data communication between a camera body and a wireless communication device, and any combinations thereof. In one example, a request is made from a camera body, the wireless communication device immediately requests the actual data value from one or more lighting devices (e.g., local, remote), the lighting device returns the information, and the wireless communication device communicates the data to the camera body via one or more contacts of the hot shoe connector. In another example, the wireless communication device can hold off a camera request for a data value by utilizing a handshake signal (RTS, CTS) back to the camera that tells the camera the wireless communication device is not ready for the next request. In certain situations (e.g., certain camera configurations and/or communications protocols), such immediate retrieval and communication may not be possible fast enough to satisfy the requirements of the camera body. In one such example situation, the camera body may discontinue hot shoe communications (e.g., determining that a lighting device/a wireless communication device mimicking a lighting device is not connected to the hot shoe) if the camera body does not receive a proper return communication from the wireless communication device in the hot shoe.

A wireless communication device may be configured with a memory for storing information related to the operation of the wireless communication device. Examples of a memory include, but are not limited to, a random access memory (RAM), a flash memory, a disk drive, and any combinations thereof. Examples of information that may be stored in a memory include, but are not limited to, actual flash data from one or more remote lighting devices, default flash, other data, instructions for operating the wireless communication device, and any combinations thereof. In one example, a memory may store actual flash data related to one or more lighting devices that is retrieved wirelessly utilizing a wireless communication circuitry of the wireless communication device. In such an example, the wireless communication device may retrieve one or more data elements from one or more lighting devices, such as at a time between a wake up status indication (e.g., wake from sleep of camera, power on of camera) and an initial data communication from the camera body. In another such example, the wireless communication device may retrieve one or more data elements from one or more lighting devices at power on of the wireless communication device. In yet another such example, the wireless communication device may retrieve one or more data elements from one or more lighting devices after an initial request for data by a camera body. In still another such example, the wireless communication device may retrieve one or more data elements from one or more lighting devices between data communication series from a camera body.

In a another exemplary implementation, a wireless communication device may wirelessly request updates of data from one or more remote devices for storage in a memory at a rate that is much faster than the rate of iteration of hot shoe communication between a camera body and the wireless communication device. In one example, a time between iterations of hot shoe data exchange may be about 30 to about 80 milliseconds. In such an example, wireless communication and retrieval of data from one or more remote devices may be able to occur, for example, in about a few milliseconds per exchange. In one aspect, the memory of the wireless communication device may likely have the most recent actual value for one or more data elements requested by a camera body.

Figure 4:
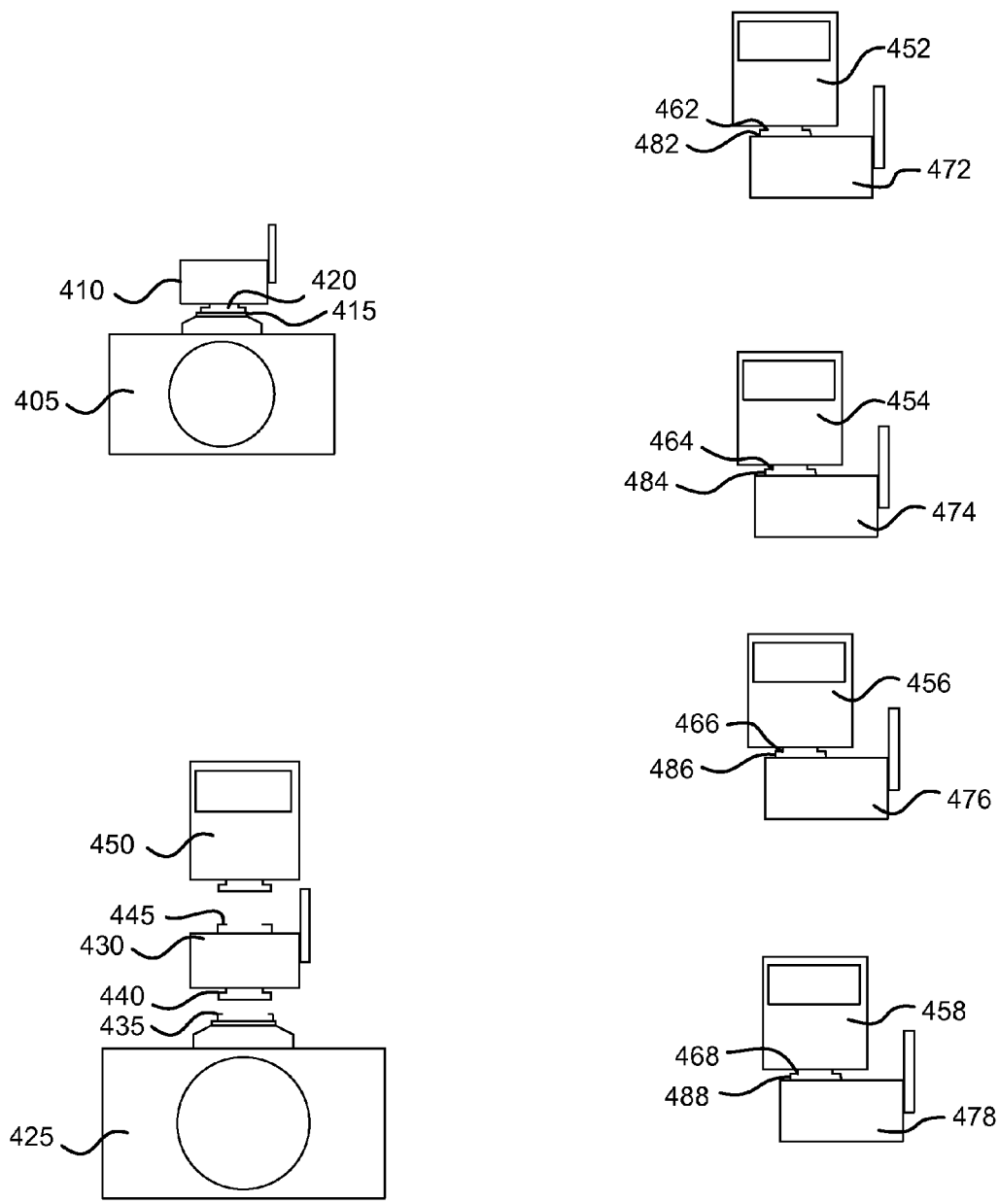
FIG. 4 illustrates two exemplary implementations of a wireless communication device having one or more hot shoe connectors.

In still another exemplary implementation, one or more data elements to be provided to a camera body from a wireless communication device via one or more data contacts of a hot shoe is a value known by the wireless communication device. A value known by a wireless communication device may be stored in a memory of the wireless communication device (e.g., until used, for a set period of time). Such a value may be a default value for a particular flash data FIG. 4 illustrates another exemplary implementation of wireless communication between a camera body 405 and one or more remote devices. Camera body 405 includes a wireless communication device 410 connected via a hot shoe connector 415 of camera body 405 and a hot shoe connector 420 of wireless communication device 410. In an alternative implementation, a camera body 425 may have a wireless communication device 430 connected thereto via a hot shoe connector 435 of camera body 425 and a hot shoe connector 440 of wireless communication device 430. Wireless communication device 430 also includes an additional hot shoe connector 445 configured to allow connection of a lighting device 450 to camera body 425 via wireless communication device 430 and circuitry therein for connecting the contacts of hot shoe connector 445 with hot shoe connector 440. Wireless communication device 430, lighting device 450, and camera body 425 are shown in a separated position for illustrative purposes. Operation of wireless communication device 430, lighting device 450, and camera body 425 may include a requirement that the elements be operatively connected. Examples of wireless communication devices having hot shoe pass-through (e.g., direct pass-through, indirect pass-through having communications intercepted via a processor) are discussed further below with respect to FIGS. 7 and 8. The following discussions will utilize wireless communication device 410 for discussion purposes. It should be noted that another hot shoe wireless communication device as described herein, such as a hot shoe bypass wireless communication device (e.g., device 430), may also be utilized. Device 430 will be discussed where appropriate to describe relevant functionality of the bypass.

FIG. 4 also illustrates a plurality of remote lighting devices 452, 454, 456, 458, each having a hot shoe connector 462, 464, 466, 468, respectively. Remote lighting devices 452, 454, 456, 458 are each associated with a corresponding wireless communication device 472, 474, 476, 478. Wireless communication devices 472, 474, 476, 478 each have a hot shoe connector 482, 484, 486, 488, respectively. Hot shoe connectors 462, 464, 466, 468 are configured for connecting to hot shoe connectors 482, 484, 486, 488, respectively. In one example, wireless communication devices 472, 474, 476, 478 are each configured to communicate with the corresponding lighting device 452, 454, 456, 458 via the hot shoe connectors to receive from the corresponding lighting device one or more flash data for wireless communication (e.g., using a wireless communication circuitry, a control circuitry, an antenna, etc.) to wireless communication device 410 and/or 430. Although shown as connectable via hot shoe connection, each of lighting devices 452, 454, 456, 458 and corresponding wireless communication devices 472, 474, 476, 478 may be connected in a different manner (e.g., via the wireless communication functionality of one or more of wireless communication devices 472, 474, 476, 478 being internal to corresponding ones of lighting devices 452, 454, 456, 458; by another type of external connection). It should also be noted that a wireless communication device connected to a hot shoe connector of a camera body may also be utilized to communicate wirelessly to and/or from one or more other remote devices other than a lighting device (e.g., a remote camera, a remote light metering device, a remote color metering device).

It is noted that although FIG. 4 illustrates four remote lighting devices, any number of one or more lighting devices may be communicated to/from utilizing a wireless communication device as discussed herein (e.g., devices 410, 430). Lighting devices as discussed herein may include any of a variety of lighting devices. Example lighting devices include, but are not limited to, a flash device (e.g., a studio flash pack, a speedlight), a continuous lighting device (e.g., a modeling light, a continuous studio light), and any combinations thereof.

Wireless communication with a plurality of remote devices may occur in a variety of ways. In one example, communication to each remote device may occur on a different wireless communication channel. In another example, two or more remote devices may share a channel. In one such example, multiple sets of remote devices sharing channels may exist. In another such example, a single set of two or more remote devices share a channel. In yet another example, a wireless communication may utilize addressing to control communication with multiple remote devices (e.g., assigning a unique address to each remote device, assigning a unique address to sets of remote devices). In still another example, communication to each remote device or each set of remote devices may occur substantially simultaneously. In still yet another example, communication to each remote device or each set of remote devices may occur sequentially.

Referring again to FIG. 4, in one exemplary implementation, wireless communication device 410 is configured to respond to requests for data from camera body 405 made via data contacts of hot shoe connectors 415, 420 with responses that include flash data from one or more of remote lighting devices 452, 454, 456, 458 (e.g., responses of flash data that mimic a lighting device connected to hot shoe connector 415). In one example, camera body 405 may expect to receive in response to its request flash data corresponding to a local flash device connected to its hot shoe connector. Where there is no flash device connected to the hot shoe connector (e.g., wireless communication device 410 in hot shoe connector 415) there is no local flash data to respond. In one exemplary aspect, camera body 405 may stop communication via data contacts of hot shoe connector 415 if a lighting device that communicates appropriate SPI-type data is not connected to hot shoe connector 415 or does not respond appropriately. As stated before a wireless communication device, such as device 410, can be used in place of that lighting device to maintain hot shoe communication from the camera body (e.g., by using actual flash data from one or more remote devices to substitute for the flash data requested by the camera body). In one example, the communication obtained by a wireless communication device (e.g., device 410, 430) with the camera body is used to obtain data elements to be used by local and/or remote lighting devices for lighting control.

In one example, camera body 405 upon wakeup (e.g., flash/wireless communication device insertion in hot shoe connector, power on, half-press of trigger, full-press of trigger) provides voltage to one or more of the data contacts and/or synchronization contact of hot shoe connector 415. After a period of time (e.g., several milliseconds), the camera initiates an initial data communication via the data contacts of the hot shoe connector. In this example, a wireless communication device capable of mimicking a lighting device is connected to the camera hot shoe (e.g., as in camera body 405 and wireless communication device 410). The initial data exchange between the camera body and wireless communication device may include one or more requests/commands and responses. Exemplary data communication from a camera body during an initial data exchange may include, but is not limited to, a status request for information from the flash device, a model request, a camera mode setting, and any combinations thereof. The wireless communication device responds to commands for information from the camera body by providing appropriate data via the data contacts of the hot shoe connector. Examples of data communication provided from a wireless communication device to a camera body at the initial round of data exchange include, but are not limited to, ready status, compatibility, dynamic power range, mode of operation, and any combinations thereof. In one example, the data provided to the camera body is a flash data. In one such example, the data is a flash data that has been retrieved (and/or updated) from a remote lighting device. In another such example, the data is a flash data that is a default value that is known to be responsive to the request, but that may not necessarily have been retrieved as actual flash data of one or more remote lighting devices. A default value may be stored in a memory and a control circuitry associates the default value with the request (e.g., when there is no actual value available).

After the initial exchange of data, a period of time may elapse before an additional exchange of data occurs via the hot shoe connector. In one example, if image acquisition does not occur and the camera does not go into a sleep mode (e.g., power off, power down), an additional round of hot shoe data communication may occur between the camera body and the wireless communication device. In another example, one or more additional rounds of hot shoe data communication between the camera body and the wireless communication device may occur repeating (e.g., with a period of time between each round) until image acquisition sequence or a sleep status is initiated. In one exemplary aspect, each round of data exchange may serve to update information obtained in an initial data exchange or a previous iteration of the one or more additional rounds of data exchange (e.g., update a shutter speed, update an aperture value, update flash ready status), communicate additional information not exchanged in an initial data exchange, update exposure compensation, and any combinations thereof. In another exemplary aspect, additional rounds of data exchange may optionally not include requests for certain information to/from a camera body and/or wireless communication device (e.g., if such information is unlikely to be modified, such as camera model information and flash device model information) that may have been made in an earlier round.

Figure 5:
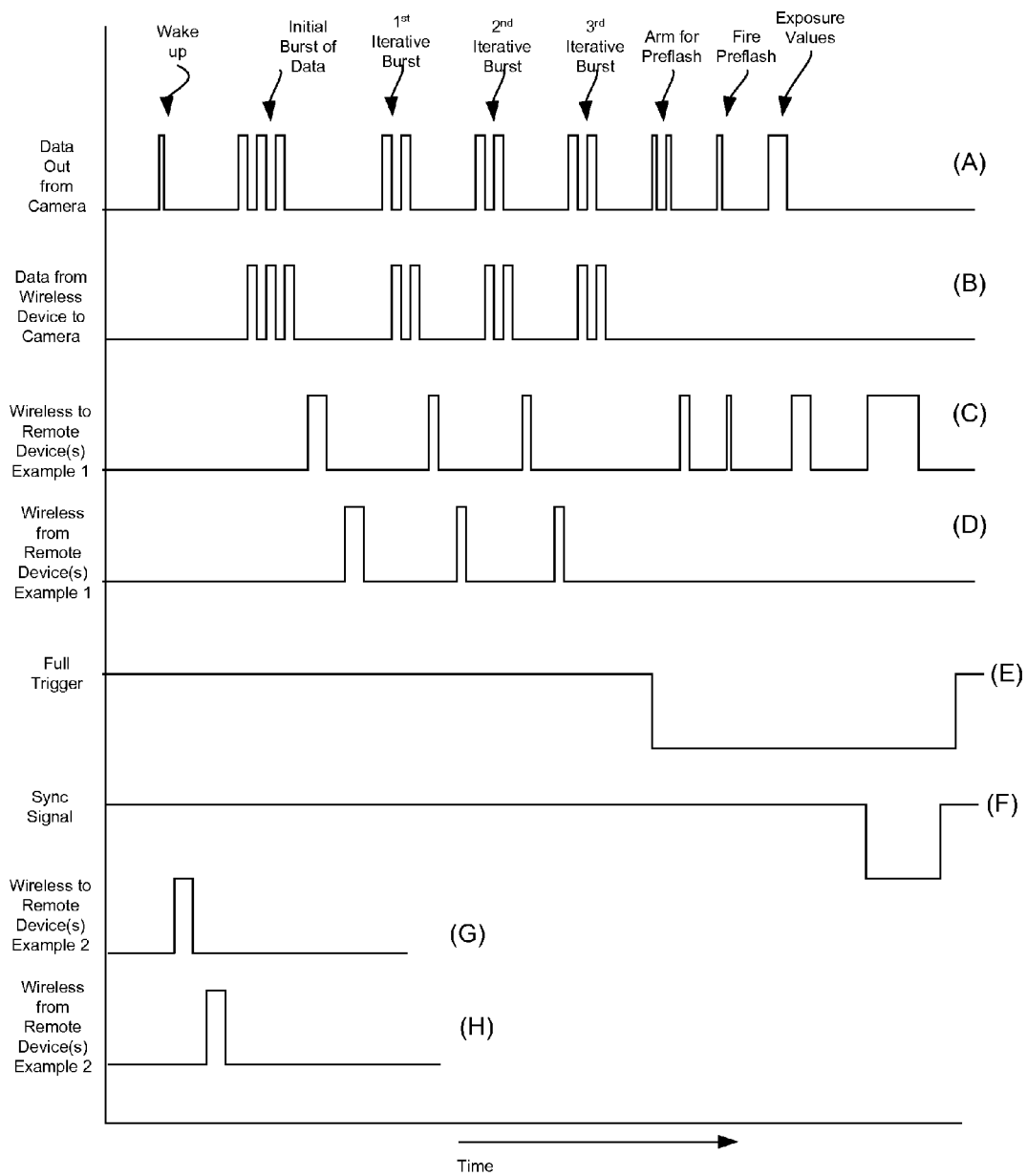
FIG. 5 illustrates exemplary timing plots.

FIG. 5 illustrates several exemplary aspects of various implementations of an information exchange via data connectors of a hot shoe connector. FIG. 5 includes a first timing plot (A) for data communicated from a camera body (e.g., body 405) to a wireless communication device (e.g., device 410) via a hot shoe connector on one or more data contacts. The plot begins with a wake up indication. A wake status may occur for a camera body in various situations. Examples of such situations include, but are not limited to, half-press of a trigger (e.g., when camera is in a sleep status), full-press of a trigger button (note the timing plots of FIG. 5 include a full-press trigger later in time), power-on, insertion of wireless communications functionality into camera hot shoe, and any combinations thereof. In this example, a wake status is indicated by a rise in voltage on one or more of the hot shoe's data contacts (e.g., one or more of the data contacts of hot shoe connector 415). After a period of time an initial series of data communications is communicated out from the camera body to the wireless communication device via the hot shoe begins ("initial burst of data"). In one example, such an initial series may request identification and/or status information related to one or more lighting devices (e.g., attempting to request flash data for a local flash device) and/or provide status and/or identification information about the camera body. FIG. 5 also includes a second timing plot (B) for data communicated from the wireless communication device to the camera body via one or more data contacts of the hot shoe. In response to the initiation of the initial series of data from the camera body, a series of data is communicated via one or more of the data contacts to the camera body from the wireless communication device (shown on line (B)). In one example, this response includes flash data. In another example, this response includes actual flash data from one or more remote flash devices.

The one or more data contacts may handle data communicated in and out of the camera body from/to the wireless communication device in a variety of ways. Such handling may depend on the configuration and/or protocol of communication for a particular camera body (e.g., different models and/or manufacturers may utilize differing communications protocols). In one example, for every bit of data communicated out from the camera, a bit of data is communicated back from the wireless communication device. In such an example, data is flowing in and out via the hot shoe simultaneously (e.g., in a full duplex fashion). In one example, one or more blank value bits may be returned from a wireless communication device while a camera body is communicating initial bits of information. In one such example, a first contact is used of input and a second contact is used for output from the camera body. In another example, a byte of data is communicated out from the camera and then a byte of data is communicated back from the wireless communication device. In one such example, one contact may be utilized for input and output communications with the camera body. FIG. 5 illustrates data from the wireless communication device to the camera body occurring at a different time from data from the camera body to the wireless communication device.

Referring again to the first (A) and second (B) timing plots of FIG. 5, after another period of time a subsequent series of data communication from the camera body to the wireless communication device initiates ("1$^{st}$ iterative burst"). In response, data from the wireless communication device is communicated via the hot shoe to the camera body (see line (B)). Again, this data communication to the camera body may include one or more flash data (e.g., from a remote flash device). In the example shown, the time delay period and iterative series of data exchange repeat two more times before an image acquisition trigger occurs. In one example, such repetition may occur until a trigger occurs or a sleep status of the camera body is initiated (e.g., where a user of the camera body has half-pressed the trigger to activate one or more sensors of the camera and holds the half press). In such an example, one or more settings and/or status of the camera may be modified during the iterations such that a subsequent iteration communicates such data to the wireless communication device (which may communicate it to one or more lighting devices). The "full trigger" timing plot (E) indicates that after the third iteration of the subsequent data exchange between the camera body and the wireless communication device in this example, trigger voltage goes low and initiates an image acquisition.

FIG. 5 also includes exemplary timing plots for one example implementation of wireless communication from a wireless communication device to one or more remote devices (C) and wireless communication from one or more remote devices to a wireless communication device (D). In this example, an initial series of data is received from a camera body ("initial burst of data"). In one example, if the initial series includes a request for data from a lighting device to be controlled and the wireless communication device is not configured to retrieve an actual value from a lighting device in real time, a value (e.g., an actual value, a default value) may be provided in a variety of ways. In one example of a way to provide a value in response to a request where an actual value is not available, a default value may be stored in a memory of the wireless communication device. Example sources for a default value include, but are not limited to, a prior retrieved value from one or more lighting devices (e.g., a value stored from a prior power-on/wake status cycle, a value stored after a prior request by the camera body), a default value set by a manufacturer of the wireless communication device, a value set using one or more input controls on the wireless communication device (e.g., a dial, an LED screen, a button, etc.), and any combinations thereof.

After the initial series is received from the camera body in the current example of FIG. 5, the wireless communication device responds with a series of data (e.g., flash data obtained as discussed above). The plot (D) for wireless communication from the wireless communication device illustrates a wireless communication to one or more remote devices during the time of hot shoe inactivity between the initial data exchange and the first iterative data exchange between the camera body and the wireless communication device. This wireless communication may request one or more data elements from the one or more remote lighting devices. During this same period of inactivity, a wireless communication occurs from one or more remote devices to the wireless communication device with a response to the data request. Thus, in this example, when the camera body makes it's next request for data, the memory of the wireless communication device will have an actual value with which to respond. Subsequent periods of activity in this example also illustrate wireless exchanges of data between the wireless communication device and one or more remote devices (e.g., to update data, to obtain data requested for a first time in a subsequent data communication from the camera body).

FIG. 5 also illustrates exemplary hot shoe communication between a camera body and a wireless communication device during an example of image acquisition. In this example, image acquisition occurs using an example of a TTL process. After full trigger activation (illustrated as a voltage drop on the full trigger line), the camera body communicates a series of data via the hot shoe to the wireless communication device to instruct a lighting device to arm for TTL preflash ("arm for preflash"). The wireless communication device wirelessly communicates data reflecting the arm for preflash command to one or more lighting devices and/or communicate data to a local lighting device (e.g., lighting device 450) connected to a pass-through hot shoe connector of the wireless communication device. The camera body next communicates via the hot shoe a data command for preflash fire ("fire preflash"). The wireless communication device wirelessly communicates data reflecting the preflash fire command to one or more lighting devices and/or communicate data to a local lighting device (e.g., lighting device 450) connected to a pass-through hot shoe connector of the wireless communication device. The preflash arming and firing sequence shown in FIG. 5 is simultaneous for the one or more lighting devices (e.g., local and/or remote). Subsequently, the one or more lighting devices fire and a TTL metering process occurs. It is contemplated that a wireless communication device may be configured to communicate a TTL preflash arming and firing sequence for each of one or more lighting devices to be controlled and/or sets of one or more lighting devices to be controlled in a sequence. In such an example, metering may be accomplished for each lighting device or set of lighting devices separately. After metering, the camera body communicates via the hot shoe TTL exposure values for adjusting from the metered preflash to the wireless communication device. The wireless communication device communicates the TTL exposure values to the one or more lighting devices to be controlled. In one example, exposure values are determined and communicated for each of the one or more lighting devices and/or sets of lighting devices. In another example, an exposure value is communicated for all lighting devices. Subsequently, the synchronization signal ("sync signal") of the camera body goes low and is communicated to the wireless communication device (e.g., via the center synchronization contact of the hot shoe connector), which in turn communicates the sync signal (e.g., via a pass-through hot shoe, via wireless communication) to the one or more light devices to be controlled.

Figure 6:
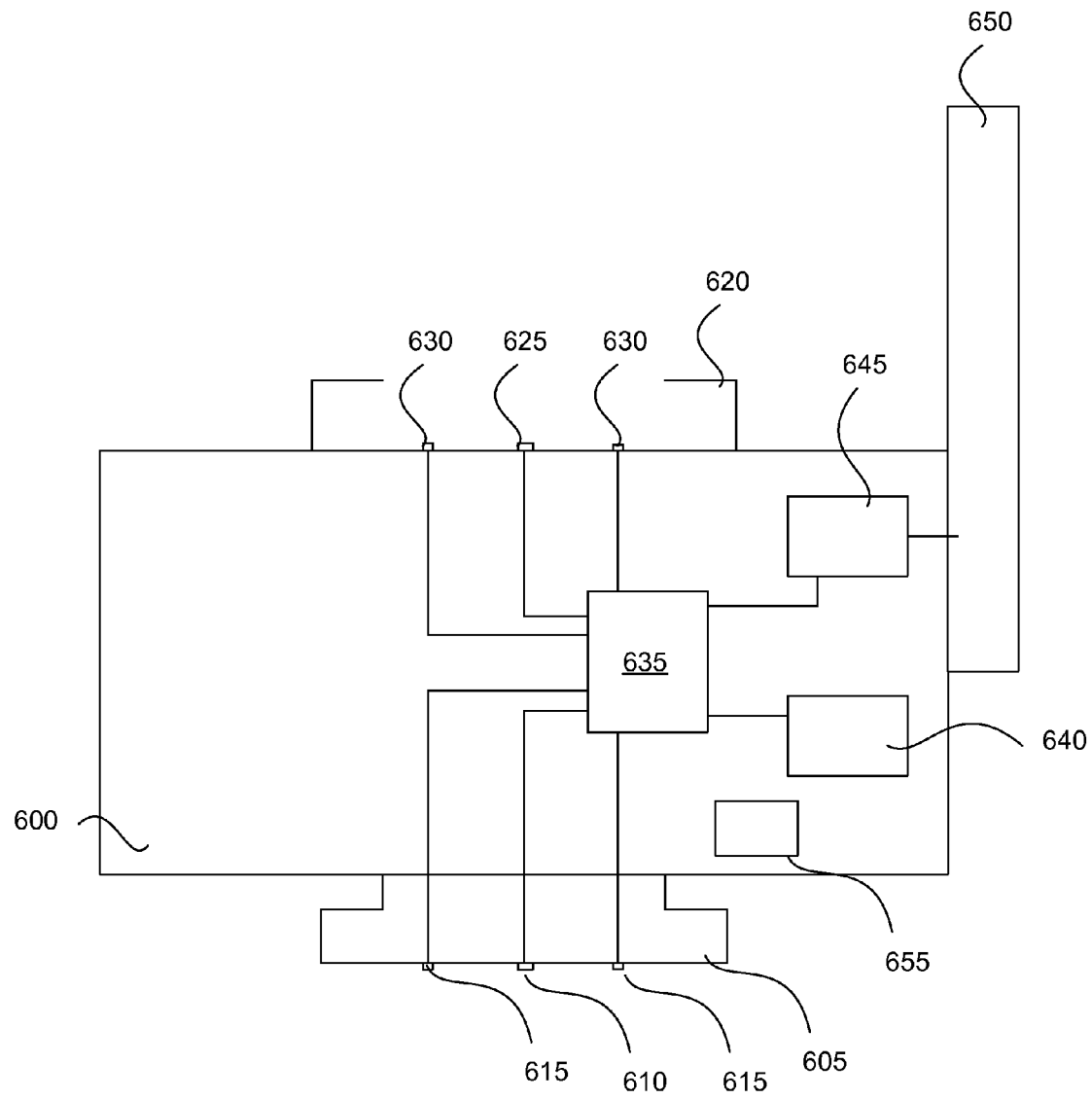
FIG. 6 illustrates yet another exemplary implementation of a wireless communication device having hot shoe connectors.

FIG. 6 illustrates an exemplary implementation of a wireless communication device 600 having a bypass connector. Elements of wireless communication device 600 that are similar to elements of wireless communication device 305 of FIG. 3 and wireless communication device 600 have similar functions and configuration as described above (e.g., with respect to FIG. 3) except as indicated. Wireless communication device 600 includes a first hot shoe connector 605. Hot shoe connector 605 is configured as a male hot shoe connector. Hot shoe connector 605 includes a center synchronization contact 610 and a plurality of data contacts 615. FIG. 6 is shown with two data contacts for convenience of view. Wireless communication device 600 also includes an second hot shoe connector 620 (a pass-through hot shoe connector). Hot shoe connector 620 is configured as a female hot shoe connector. Hot shoe connector 620 includes a center synchronization contact 625 and a plurality of data contacts 630. Hot shoe connector 620 is shown with two data contacts for convenience of view. Contacts 625 and 630 are shown as raised contact for convenience of view. In another example, contacts 625 and 630 are flat surface contacts (e.g., typical female hot shoe contacts).

Wireless communication device 600 includes a processor 635 and a memory 640. Processor 635 controls aspects of the operation of wireless communication device 600 (e.g., data communication via data contacts 615, 630, synchronization communication via sync contacts 610, 625, wireless communication, intelligence related to determining which data elements to update). Memory 640 is electrically connected with processor 635. Device 600 also includes a wireless communication circuitry 645 and an antenna 650. Wireless communication device 600 includes a power source 655 for providing power to one or more of the components of wireless communication device 600.

Processor 635 is shown with wired connection (e.g., direct, indirect) to contacts 610, 615 and wired connection (e.g., direct, indirect) to contacts 625, 630 of hot shoe connector 620. In the example shown, contacts of hot shoe connector 605 and 620 are connected to processor 635 and not directly connected to each other. In another example, one or more of corresponding contacts of hot shoe connectors 605 and 620 may be wired as direct pass-throughs. In one such example, one or more direct pass-throughs may be electrically tapped to a connection to processor 635 so that processor 635 may control and/or monitor communication via the direct pass-through. In yet another example, processor 635 controls communication between contacts of hot shoe connector 605 and hot shoe connector 620.

Figure 7:
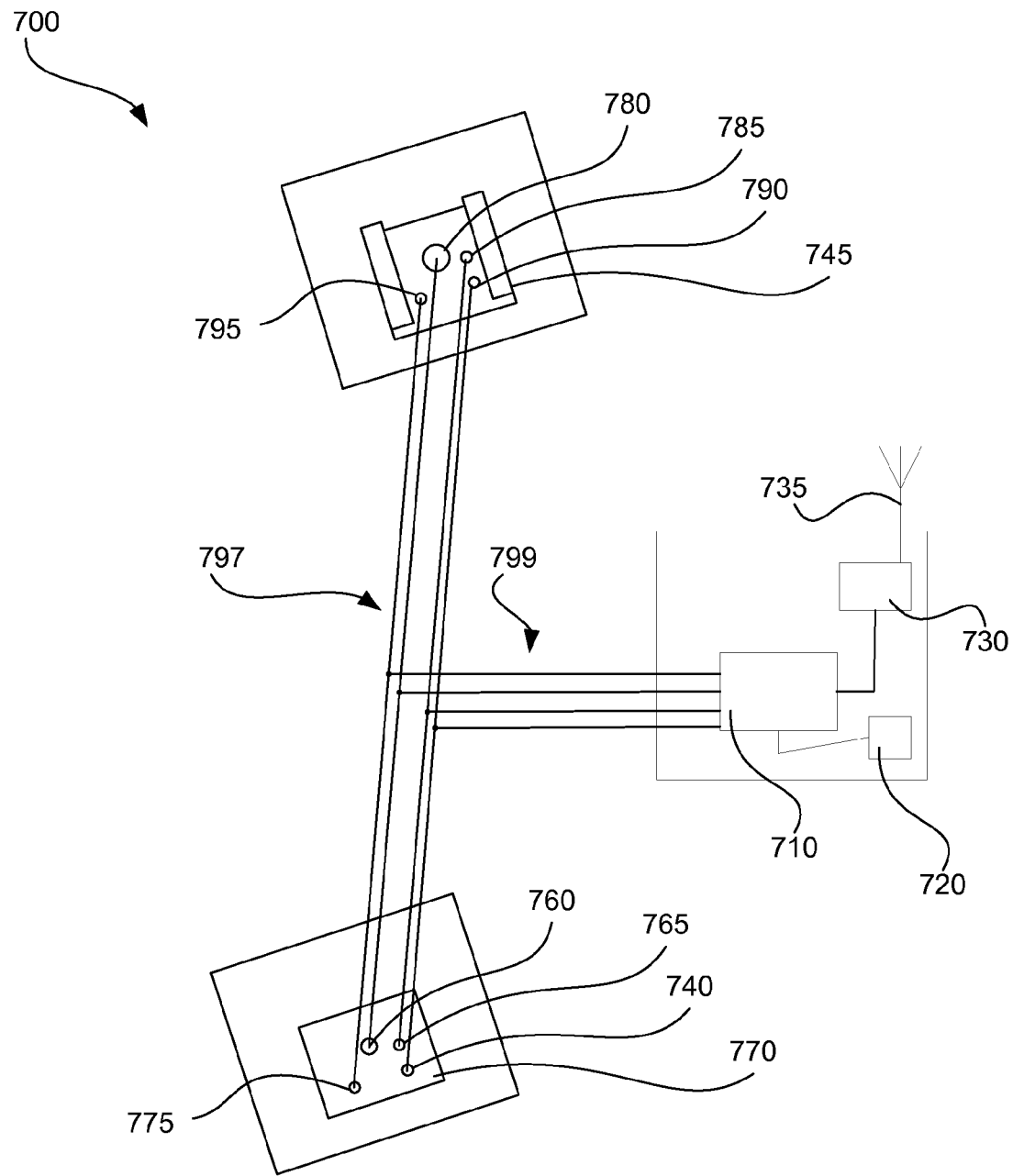
FIG. 7 illustrates one exemplary implementation of a wireless communication device having a pass-through hot shoe connector.

FIG. 7 illustrates electrical connections and internal circuitry of an exemplary wireless communication module 700 having a pass-through hot shoe connection. Elements of wireless communication module 700 that are similar to elements of wireless communication device 305 and/or 600 and wireless communication device 700 itself have similar functions and configuration as described above except as indicated. Module 700 includes a processor 710 and a memory 720. Processor 710 controls the operation of module 700 and information that may be communicated wirelessly to and/or from module 700. Memory 720 is in electrical communication with processor 710. Memory 720 may include machine executable instructions that may be executed by processor 710 in operating module 700. Module 700 includes a wireless communication circuitry 730 and an antenna 735 that are in electrical communication with processor 710.

Module 700 also includes a hot shoe connector 740 and a hot shoe connector 745, each positioned on a body of module 700. Hot shoe connector 740 is configured for connection to a hot shoe connector of a camera body. Hot shoe connector 745 is configured for connection to a hot shoe connector of an accessory device (e.g., a flash device). Hot shoe connector 740 includes a center synch contact 760 and three additional contacts 765, 770, 775. Hot shoe connector 745 includes a center synch contact 780 and three additional contacts 785, 790, and 795. It is contemplated that alternative hot shoe configurations may be used that have any number of one or more contacts. Contacts 760, 765, 770, and 775 are connected to contacts 780, 785, 790, and 795, respectively, by electrical connections 797. Electrical connections 797 are configured to allow information from a camera body connected to hot shoe connector 740 to pass via the appropriate connector channel to the corresponding contact of hot shoe connector 745. In another example, electrical connections 797 are configured to allow information from an accessory device connected to hot shoe connector 745 to pass via the appropriate connector channel to the corresponding contact of hot shoe connector 740. Exemplary structures for each of electrical connections 797 include, but are not limited to, a wire, a printed circuit board electrical path, spring contact, and any combinations thereof. In one example, one or more data or other signal communicated via electrical connections 797 may be accessed by processor 710. In another exemplary aspect, information communication via electrical connections 797 to and/or from hot shoe connector 740 to and/or from hot shoe connector 745 need not pass through processor 710 for communications between a connected camera body and a connected accessory device.

Module 700 also includes electrical connections 799 that provide electrical connection (e.g., a tapping) between electrical connections 797 and processor 710. Electrical connections 799 allow processor 710 to manage information from a camera body connected to hot shoe connector 740 and to pass the information (e.g., as raw information and/or after appropriate formatting) to wireless communication circuitry 730 for wireless communication to a remote device via antenna 735. In another implementation, where wireless communication circuitry 730 includes receiver circuitry (e.g., as a separate circuit, as a transceiver), electrical connections 799 may allow processor 710 to manage information wirelessly received by module 700 and to pass the information (e.g., as raw information and/or after appropriate formatting) via electrical connections 797 to a camera body connected to hot shoe connector 740.

The connection path including center synch contacts 760 and 780 (and a corresponding one of electrical connections 797) may be utilized to transmit a synchronization signal from the camera body to an attached accessory. The synchronization signal may also be received by processor 710 via a corresponding one of electrical connections 799 for wireless communication to one or more remote devices. In alternative embodiments information other than a synchronization signal may be passed using this connection path (e.g., information representing a shutter speed). Additional contacts 765, 770, and 775, and additional contacts 785, 790, and 795 (and corresponding ones of electrical connections 797) may be configured to pass a variety of different information to and/or from a camera body connected to module 700. In one example, one connection path may be utilized for a clock signal from an attached camera body. A clock signal may be utilized by an attached accessory and/or a remote device for synchronizing data transfer to/from camera and device. In another example, one or more of the connection paths may be configured for exchange of serial camera and/or flash data (e.g., TTL information).

Referring again to FIG. 7, in certain situations where a local hot shoe flash is connected to the hot shoe connector 745 it may not be desirable to have the local flash fire. Such situations include, but are not limited to, when using one or more remote flashes and taking an image of a larger scene more appropriately lit by the remote flashes, situations where the glare of the local flash would be inappropriate, such as near a mirror or glass window.

Figure 8:
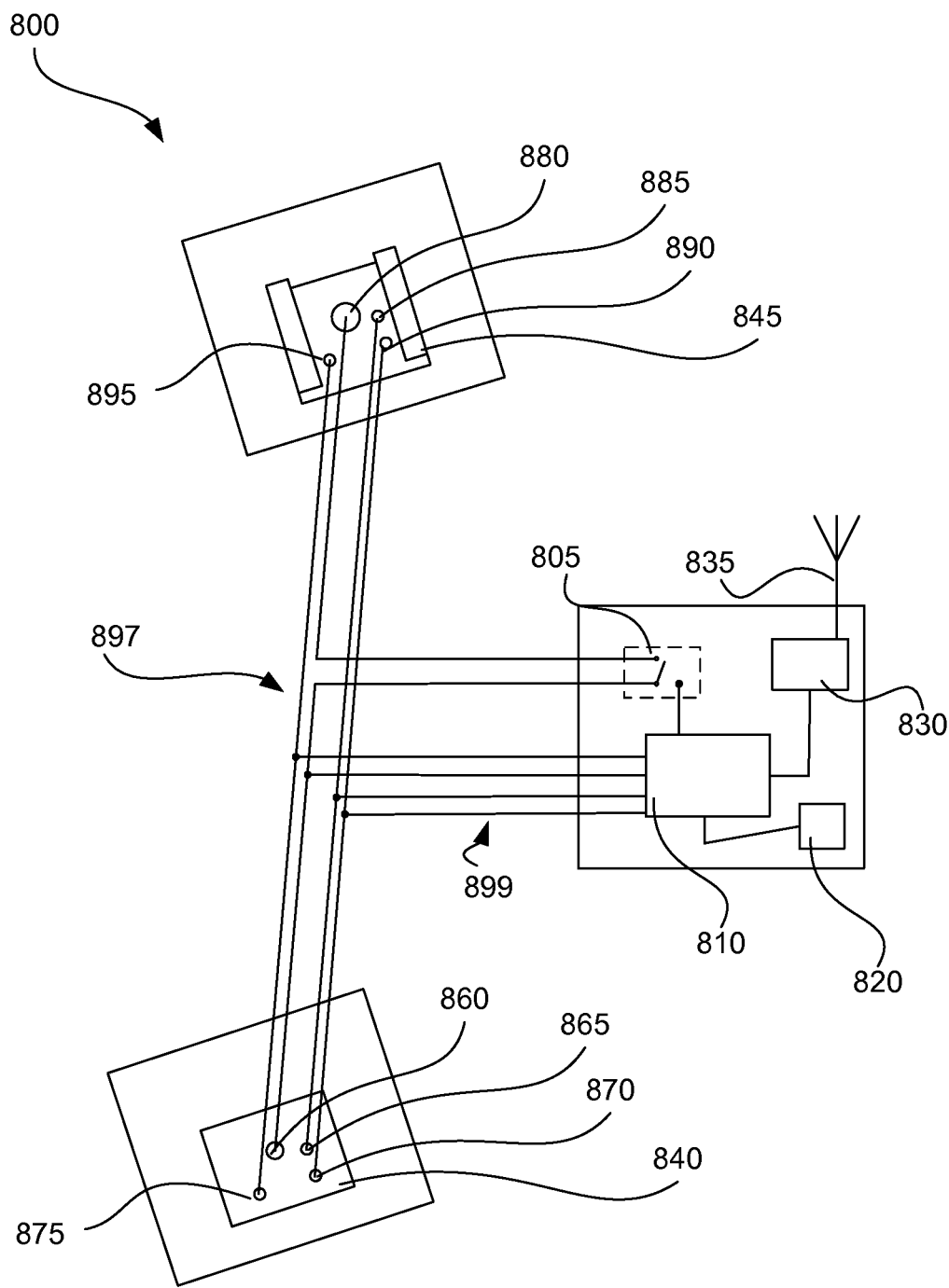
FIG. 8 illustrates another exemplary implementation of a wireless communication device having a pass-through hot shoe connector.

FIG. 8 illustrates another embodiment of a wireless communication module 800. Wireless communication module 800 is configured similarly to (and has similar functionality as) wireless communication module 700 of FIG. 7, except as discussed below. Module 800 includes a hot shoe connector 840 having contacts 860, 865, 870, 875 and a hot shoe connector 845 having contact 880, 885, 890, 895. Module 800 also include a control circuit (e.g., processor) 810, a memory 820, a wireless communication circuitry 830, an antenna 835, and electrical connections 797, 799. Module 800 includes a switching element 805. Switching element 805 is connected to a center synch contact 860 of a hot shoe connector 840 via a first electrical connection and connected to a center synch contact 880 of a hot shoe connector 845 via a second electrical connection. Switching element 805 intercepts signals between center synch contacts 860 and 880. A processor 810 controls the operation of switch 805. Switch 805 may selectively connect center synch contact 860 with center synch contact 880 utilizing control by processor 810. Processor 810 remains connected to center synch contact 860 via one of electrical connections 899. In one example, a mechanical switching device (e.g., a button, toggle, etc.) on module 800 may be actuated by a user to set switch 805 to a desired location. Alternatively, switch 805 may be controlled directly via a mechanical switch of module 800 without the control of processor 810. In another example, a solid state switch 805 may be controlled via processor 830 and a mode set by a user (e.g., via a mechanical switch on module 800) of module 800. In yet another example, processor 830 (e.g., in conjunction with instructions stored in a memory 820) may monitor operating conditions of a camera connected to hot shoe connector 840 and utilizing the operating conditions set a mode of operation of module 800 to have switch 805 selectively connect or disconnect one or more connectors of hot shoe connector 845 from corresponding one or more connectors of hot shoe connector 840. In one example, a camera may be programmed to allow a user to set one of a plurality of modes (e.g., using a control, such as a screen and/or button, of the camera) for determining the connectivity of hot shoe connector 845 to one or more commands or information from the camera. Processor 810 may detect information from the camera regarding this selected mode and instruct switch 805 accordingly.

In one example of operation of module 800, when switch 805 intercepts (i.e., blocks) a synchronization signal sent by a camera body connected to hot shoe connector 840, the synchronization signal may be received by processor 810 for wireless transmission to one or more remote flash devices. In this way, the local flash device connected to hot shoe 845 will not fire, while the one or more remote flash devices will fire. Similarly, by switching switch 805 to have the synchronization signal only go to the local hot shoe flash, the one or more remote flash devices will not fire. This may be desirable when taking close-up images of near objects (e.g., where side lighting from one or more remote lighting devices may not be appropriate for the imaging situation).

In an alternative embodiment, switch 805 may intercept a different or additional one or more communication paths formed by one or more of electrical connections 897 between connectors of the two hot shoe connectors 840 and 845. For example, switch 805 may be configured to intercept a communication path utilized for a clocking signal. In certain situation (e.g., synchronous serial communication), if a clocking signal is not received by an accessory device connected to hot shoe 845, the accessory device will not be instructed to act upon other information that is received via one or more of the other additional connectors.

One exemplary advantage of a wireless communication module having a switching element, such as switching element 805 of module 800 of FIG. 8, is that an un-powered accessory device connected to a hot shoe of a module may impact the capacitance of one or more communication paths (or other electrical properties) such as to negatively impact signals transmitted. A switched communication path may prevent the capacitance-impact on that communication path. In one example, one or more communication paths may be switched. In another example, all communication paths may be switched.

One exemplary advantage of a wireless communication module with a second hot shoe connector is that wireless communication capability can be provided to a camera body via the hot shoe of the camera body while still allowing the camera body to take advantage of a hot shoe accessory device, such as a local external flash. In another exemplary aspect, such an advantage may be achieved with a wireless module and accessory device affixed directly to the hot shoe of the camera body. In one example, a wireless communication module of the present disclosure may be sized and shaped to add a minimal amount of weight and volume to the size of the camera, even when an accessory device is attached thereto.

Figure 9:
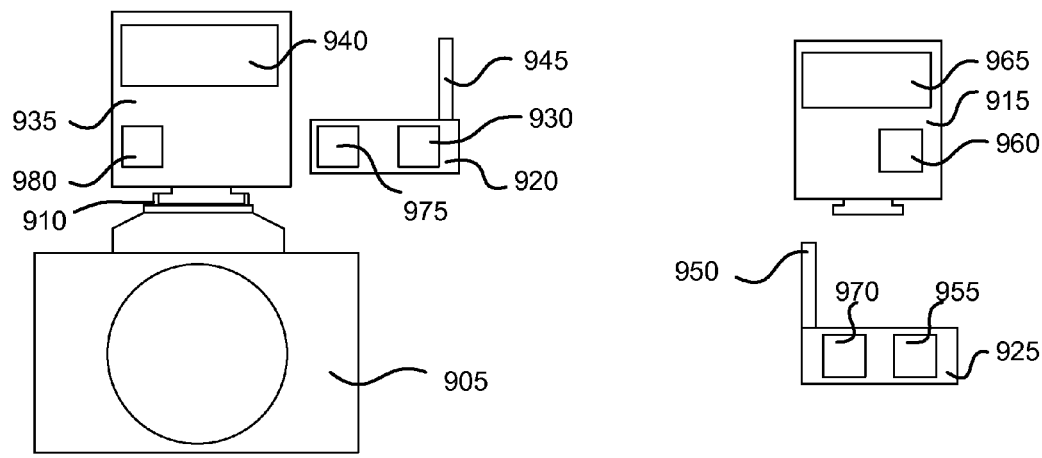
FIG. 9 illustrates one exemplary implementation of a wireless communication device having optical transmission and sensor capability.

FIG. 9 illustrates an exemplary camera body 905 having a hot shoe connector 910. Camera body 905 may communicate with one or more remote lighting devices, such as a lighting device 915 utilizing a wireless communication device 920 and a wireless communication device 925. Wireless communication devices 920, 925 include similar functionality and configuration as other wireless communication devices described herein, except as described differently below.

Wireless communication device 920 is positioned proximate camera body 905 and wireless communication device 925 is positioned proximate lighting device 915. Wireless communication device 920 may obtain a synchronization signal from camera body 905 in a variety of ways. In one exemplary aspect, a synchronization signal may be utilized to synchronize the emission of light from lighting device 915 with image acquisition using camera body 905. Examples of ways to obtain a synchronization signal from a camera body include, but are not limited to, from a hot shoe of a camera body, from a PC connector of a camera body, from an optical emission from a camera body, from an optical emission from a lighting device connected to a camera body, from an internal connection of a camera body, and any combinations thereof.

As shown in FIG. 9, wireless communication device 925 is positioned proximate lighting device 915. Synchronization information may be communicated from a wireless communication device to a lighting device in a variety of ways. Example ways include, but are not limited to, via a wired connection from a wireless communication device to an external synchronization port (e.g., a PC connector or other synchronization connector) on a lighting device, via a connection (e.g., via a wire, via direct connection) of a wireless communication device to a hot shoe of a lighting device, via optical communication between a wireless communication device and a lighting device, via internal connection within a lighting device (e.g., where a wireless communication device is internal to a lighting device), and any combinations thereof.

Wireless communication device 920, as shown in FIG. 9, includes an optical sensor 930. An optical sensor may be any optical sensor (e.g., visible sensor, IR sensor) configured to detect an optical signal from a camera body and/or a device associated with a camera body (e.g., a flash device inserted in a hot shoe of a camera body). A flash device 935 is connected to camera body 905 via hot shoe connector 910. As discussed above, wireless communication device 920 is positioned proximate camera body 905. Flash device 935 includes a light emission element 940 (e.g., a flash tube). In an alternative embodiment, camera body 905 may include an internal flash device that may act similarly to flash device 935. Wireless communication device 920 includes an antenna 945 and appropriate transmitter and, optionally, receiver circuitry (e.g., a transceiver) connected thereto for wirelessly communicating using radio frequency. Wireless communication device 920 is shown with an external antenna. It is contemplated that a wireless communication device may have an internal antenna instead of (or in addition to) an external antenna. Wireless communication device 925 includes an antenna 950 and appropriate receiver and, optionally, transmitter circuitry (e.g., a transceiver) connected thereto for wirelessly communicating using radio frequency. Wireless communication device 925 also includes an optical emission element 955. Optical emission element 955 may include any optical emission element capable of emitting an optical signal for detection by an optical sensor 960 of lighting device 915.

In one exemplary implementation, camera body 905 may communicate synchronization information and/or other camera data (e.g., camera data, ISO, shutter speed, exposure compensation, information representing a shutter speed, etc.) via hot shoe connector 910 to flash device 935. Flash device 935 emits light via light emission element 940 representing the synchronization information and/or other camera data (e.g. via pulses of light). Optical sensor 930 detects the optical information and circuitry of wireless communication device 905 processes the information. Part or all of the information may then be transmitted wirelessly via radio frequency utilizing transmission circuitry and antenna 945. Antenna 950 detects the radio frequency signal and circuitry of wireless communication device 925 processes the information (e.g., synchronization and/or other camera data) for optical communication via optical emission element 955 to optical sensor 960. Circuitry of lighting device 915 utilizes the information for proper synchronization and/or other control (e.g., TTL control, light power regulation) of light emission from a lighting element 965 of lighting device 915.

In another exemplary implementation, wireless communication device 925 may include an optional optical sensor 970. Wireless communication device 920 may also include an optional optical emission element 975. Information from lighting device 915 (e.g., flash readiness, flash capability) may be communicated to camera body 905 utilizing optical and radio frequency wireless communication. In such an example, information from lighting device 915 may be converted by appropriate circuitry of lighting device 915 that may be emitted optically using lighting element 965 as an optical signal (e.g., optical data pulses). Optical sensor 970 detects the optical information and circuitry of wireless communication device 925 processes the information for wireless communication using radio frequency via a transmission circuitry and antenna 950. Antenna 945 and receiver circuitry of wireless communication device 920 receive the radio frequency transmission. Optical emission element 975 emits an optical signal representing the information. The optical signal is detected by an optional optical sensor 980 of flash device 935. Flash device 935 communicates the information to camera body 905 via hot shoe connector 910. In an alternative implementation, optical sensor 980 may be part of camera body 905 and information may be directly detected into camera body 905.

Figure 10:
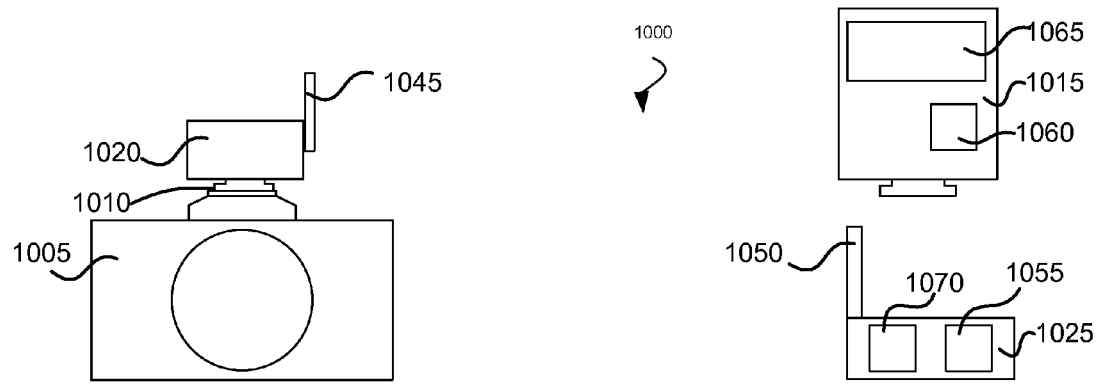
FIG. 10 illustrates another exemplary implementation of a wireless communication device having optical transmission and sensor capability.

FIG. 10 illustrates another implementation of a wireless communication system 1000. Components of system 1000 may include similar functionality to like components described above (e.g., with respect to FIG. 10) except as described as different below. A camera body 1005 includes a hot shoe connector 1010. Camera body 1005 may communicate synchronization and/or other camera data to one or more remote lighting devices, such as lighting device 1015, utilizing a radio frequency wireless communication device 1020 connected to camera body 1005 via hot shoe connector 1010. A wireless communication device 1025 is positioned proximate lighting device 1015. Wireless communication device 1020 includes an antenna 1045 and appropriate transmitter and, optionally, receiver circuitry (e.g., a transceiver) connected thereto for wirelessly communicating using radio frequency. Wireless communication device 1025 includes an antenna 1050 and appropriate receiver and, optionally, transmitter circuitry (e.g., a transceiver) connected thereto for wirelessly communicating using radio frequency. Wireless communication device 1025 also includes an optical emission element 1055.

In one exemplary implementation, camera body 1005 may communicate synchronization information and/or other camera data to wireless communication device 1020 via hot shoe connector 1010. Part or all of the information may then be transmitted wirelessly via radio frequency utilizing transmission circuitry and antenna 1045. Antenna 1050 detects the radio frequency signal and circuitry of wireless communication device 1025 processes the information (e.g., synchronization and/or other camera data) for optical communication via optical emission element 1055 to optical sensor 1060. Circuitry of lighting device 1015 utilizes the information for proper synchronization and/or other control of light emission from a lighting element 1065 of lighting device 1015.

In another exemplary implementation, wireless communication device 1025 may include an optional optical sensor 1070. Information from lighting device 1015 (e.g., flash readiness, flash capability) may be communicated to camera body 1005 utilizing optical and radio frequency wireless communication. In such an example, information from lighting device 1015 may be converted by appropriate circuitry of lighting device 1015 that may be emitted optically using lighting element 1065 as an optical signal (e.g., optical data pulses). Optical sensor 1070 detects the optical information and circuitry of wireless communication device 1025 processes the information for wireless communication using radio frequency via a transmission circuitry and antenna 1050. Antenna 1045 and receiver circuitry of wireless communication device 1020 receive the radio frequency transmission. Wireless communication device 1020 communicates the information to camera body 1005 via hot shoe connector 1010.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of synchronizing a remote lighting device to image acquisition of a camera, the camera having a hot shoe connector with a wireless communication device connected thereto, wherein the wireless communication device is not a photographic lighting device and a photographic lighting device is not directly connected to the hot shoe connector of the camera, the method comprising:
   receiving a first request for flash data from the camera at the wireless communication device via the hot shoe connector of the camera;
   responding to the first request for flash data with response data that mocks information that a photographic lighting device would provide if the photographic lighting device were connected to the hot shoe connector, such that the camera continues to provide TTL data via the hot shoe connector to the wireless communication device;
   receiving a synchronization signal at the wireless communication device via the hot shoe connector of the camera;
   wirelessly communicating TTL information from the wireless communication device to a remote photographic lighting device, the remote photographic lighting device including an internal wireless communication functionality, the TTL information being based on the TTL data from the camera body;
   wirelessly communicating a remote synchronization signal from the wireless communication device to the remote photographic lighting device; and
   synchronizing the remote photographic lighting device to an image acquisition by the camera using the remote synchronization signal and the TTL information.

2. A method according to claim 1, wherein said wirelessly communicating TTL information occurs prior to said receiving a synchronization signal at the wireless communication device.

3. A method according to claim 1, wherein said wirelessly communicating TTL information includes wirelessly communicating TTL pre-flash information.

4. A method according to claim 1, wherein said wirelessly communicating TTL information includes wirelessly communicating information related to an amount of light to be emitted by the remote photographic lighting device for a TTL main flash exposure.

5. A method according to claim 1, further comprising receiving a wireless communication of data from the remote photographic lighting device at the wireless communication device prior to said receiving a first request for flash data.

6. A method according to claim 5, wherein the wireless communication of data from the remote photographic lighting device includes wireless communication of actual flash information about the remote photographic lighting device and wherein the response data includes the actual flash information.

7. A method according to claim 1, wherein the camera hot shoe connector includes a plurality of data pin connectors and wherein said receiving from the camera a first request and said responding to the first request occur in a full duplex communication across at least two of the plurality of data pin connectors.

8. A method according to claim 1, wherein the wireless communication device is a non-light emitting device.

9. A method according to claim 1, wherein the wireless communication device includes a radio frequency transceiver.

10. A method of synchronizing a remote lighting device to image acquisition of a camera, the camera having a hot shoe connector with a wireless communication device connected thereto, wherein the wireless communication device is not a photographic lighting device and a photographic lighting device is not directly connected to the hot shoe connector of the camera, the method comprising:
    receiving a wireless communication of data from a remote photographic lighting device at the wireless communication device;
    receiving a first request for flash data from the camera at the wireless communication device via the hot shoe connector of the camera;
    responding to the first request for flash data with response data that mocks information that a photographic lighting device would provide if the photographic lighting device were connected to the hot shoe connector, such that the camera continues to provide TTL data via the hot shoe connector to the wireless communication device;
    receiving a synchronization signal at the wireless communication device via the hot shoe connector of the camera;
    wirelessly communicating TTL information from the wireless communication device to the remote photographic lighting device, the remote photographic lighting device including an internal wireless communication functionality, the TTL information being based on the TTL data from the camera body;
    wirelessly communicating a remote synchronization signal from the wireless communication device to the remote photographic lighting device; and
    synchronizing the remote photographic lighting device to an image acquisition by the camera using the remote synchronization signal and the TTL information.

11. A method according to claim 10, wherein said wirelessly communicating TTL information occurs prior to said receiving a synchronization signal at the wireless communication device.

12. A method according to claim 10, wherein said wirelessly communicating TTL information includes wirelessly communicating TTL pre-flash information.

13. A method according to claim 10, wherein said wirelessly communicating TTL information includes wirelessly communicating information related to an amount of light to be emitted by the remote photographic lighting device for a TTL main flash exposure.

14. A method according to claim 10, wherein the wireless communication of data from the remote photographic lighting device includes wireless communication of actual flash information about the remote photographic lighting device and wherein the response data includes the actual flash information.

15. A method according to claim 10, wherein the camera hot shoe connector includes a plurality of data pin connectors and wherein said receiving from the camera a first request and said responding to the first request occur in a full duplex communication across at least two of the plurality of data pin connectors.

16. A method according to claim 10, wherein the wireless communication device is a non-light emitting device.

17. A method according to claim 10, wherein the wireless communication device includes a radio frequency transceiver.

18. A system for synchronizing a remote lighting device to image acquisition of a camera, the system comprising:
a camera having a first hot shoe connector;
a remote lighting device including a first wireless communication functionality internal to said remote lighting device; and
a photographic wireless communication device including:
a second hot shoe connector configured to connect to the first hot shoe connector;
a second wireless communication functionality; and
a processing element, said processing element and photographic wireless communication device configured to receive one or more data requests from said camera via the second hot shoe connector when the second hot shoe connector is connected to the first hot shoe connector, and to respond to the one or more data requests with response information that mocks information that a flash device would provide if the flash device were connected to the first hot shoe connector instead of said photographic wireless communication device, such that in response to the response information said camera continues to provide TTL data via the first hot shoe to said photographic wireless communication device.

19. A system according to claim 18, wherein the first and second hot shoe connectors each include a plurality of data pin connectors configured for a full duplex communication such that as the photographic wireless communication device receives the one or more data requests via a first set of one or more of the plurality of data pin connectors, the photographic wireless communication device responds with response information via a second set of one or more of the plurality of data pin connectors.

20. A system according to claim 18, wherein the first wireless communication functionality is configured to receive TTL information from the second wireless communication functionality, the TTL information being based on the TTL data from the camera, and wherein the first wireless communication functionality is configured to receive a remote synchronization signal from the second wireless communication functionality.

21. A system according to claim 20, wherein the TTL information includes TTL pre-flash information.

22. A system according to claim 20, wherein the TTL information includes information related to an amount of light to be emitted by the remote photographic lighting device for a TTL main flash exposure.

23. A system according to claim 18, further comprising:
a third hot shoe connector positioned on the photographic wireless communication device; and
one or more wired connections between said second hot shoe connector and said third hot shoe connector.

24. A system according to claim 23, further comprising at least one of:
a tapping connection between at least one of the one or more wired connections and said processing element for tapping one or more signals being carried by the at least one of the one or more wired connections without preventing the one or more signals from being delivered to said third hot shoe connector; and
a switching element positioned in line with at least one of the one or more wired connections for selectively disconnecting the at least one of the one or more wired connections between said second hot shoe connector and said third hot shoe connector.

25. A system according to claim 18, wherein the second wireless communication functionality includes a radio frequency transceiver.

26. A system according to claim 18, wherein the photographic wireless communication device is a non-light-emitting device.

* * * * *